United States Patent
Kozachenok et al.

(10) Patent No.: US 11,950,576 B2
(45) Date of Patent: Apr. 9, 2024

(54) MULTI-FACTORIAL BIOMASS ESTIMATION

(71) Applicant: Ecto, Inc., Atlanta, GA (US)

(72) Inventors: Dmitry Kozachenok, Atlanta, GA (US); Allen Torng, Atlanta, GA (US)

(73) Assignee: ECTO, INC., Atlanta, GA (US)

(*) Notice: Subject to any disclaimer, the term of this patent is extended or adjusted under 35 U.S.C. 154(b) by 80 days.

(21) Appl. No.: 17/403,483

(22) Filed: Aug. 16, 2021

(65) Prior Publication Data

US 2022/0117196 A1 Apr. 21, 2022

Related U.S. Application Data

(63) Continuation of application No. 17/071,226, filed on Oct. 15, 2020, now Pat. No. 11,089,762.

(51) Int. Cl.
*A01K 5/02* (2006.01)
*A01K 29/00* (2006.01)
*A01K 61/85* (2017.01)
*G01G 17/08* (2006.01)

(52) U.S. Cl.
CPC .......... *A01K 5/0283* (2013.01); *A01K 29/005* (2013.01); *A01K 61/85* (2017.01); *G01G 17/08* (2013.01)

(58) Field of Classification Search
CPC ........ A01K 29/005; A01K 5/02; A01K 61/85; A01K 5/0283
See application file for complete search history.

(56) References Cited

U.S. PATENT DOCUMENTS

| | | | | |
|---|---|---|---|---|
| 4,963,035 A * | 10/1990 | McCarthy | ............... | A22C 25/04 702/158 |
| 5,673,647 A * | 10/1997 | Pratt | .................... | G06Q 10/087 119/842 |
| 7,905,201 B2 * | 3/2011 | Greene | ................ | A01K 23/005 119/421 |
| 8,453,601 B2 * | 6/2013 | Zimmerman | ......... | A61M 15/00 119/51.02 |
| 8,797,166 B2 * | 8/2014 | Triener | ................ | A01K 1/0107 340/573.3 |
| 9,684,956 B2 * | 6/2017 | Liao | ........................ | G06T 7/0012 |
| 10,420,350 B2 * | 9/2019 | Schmitzek | ............ | G01B 11/245 |
| 10,863,724 B2 * | 12/2020 | Moss | ............... | G06K 19/06037 |
| 2005/0257748 A1 * | 11/2005 | Kriesel | ................... | A22B 5/007 119/51.02 |
| 2007/0288249 A1 * | 12/2007 | Rowe | .................... | A01K 11/008 705/7.11 |

(Continued)

*Primary Examiner* — Yvonne R Abbott-Lewis

(57) ABSTRACT

Generating consensus biomass estimates include providing a first biomass parameter data set associated with a first biomass attribute parameter to a first biomass estimation model and providing a second biomass parameter data set associated with a second biomass attribute parameter to a second biomass estimation model different from the first biomass estimation model. The first biomass estimation model is adaptively weighted with a first weighting factor relative to a second weighting factor for the second biomass estimation model. An aggregated biomass estimate is determined based on a combination of the first biomass estimation model using the first weight factor and the second biomass estimation model using the second weight factor.

19 Claims, 9 Drawing Sheets

(56) References Cited

U.S. PATENT DOCUMENTS

| | | | | |
|---|---|---|---|---|
| 2009/0288606 A1* | 11/2009 | Zimmerman | ........ | A01K 29/005 |
| | | | | 119/51.01 |
| 2010/0289879 A1* | 11/2010 | Sinzinger | ............... | A01K 29/00 |
| | | | | 348/46 |
| 2014/0261196 A1* | 9/2014 | Stave | ....................... | A01K 5/00 |
| | | | | 119/51.01 |
| 2016/0324188 A1* | 11/2016 | Johnston | ................ | A23K 10/00 |

* cited by examiner

MULTI-FACTORIAL BIOMASS ESTIMATION

CROSS-REFERENCE TO RELATED APPLICATIONS

The present application claims priority as a continuation of U.S. patent application Ser. No. 17/071,226, entitled "METHODS FOR GENERATING CONSENSUS BIOMASS ESTIMATES" and filed on Oct. 15, 2020, the entirety of which is incorporated by reference herein.

BACKGROUND

Husbandry, such as in agriculture and aquaculture, includes raising animals for their meat, fiber, milk, eggs, or other products. Monitoring of animal growth parameters in a frequent and quantitative manner is useful for assisting in the maintenance of animal health and to maximize production efficiency. For example, in livestock farming, regular monitoring of animal weight provides an indication of animal growth rates. The live weight of animals is of particular interest, as it serves as an index for animal growth, health, and readiness for market.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
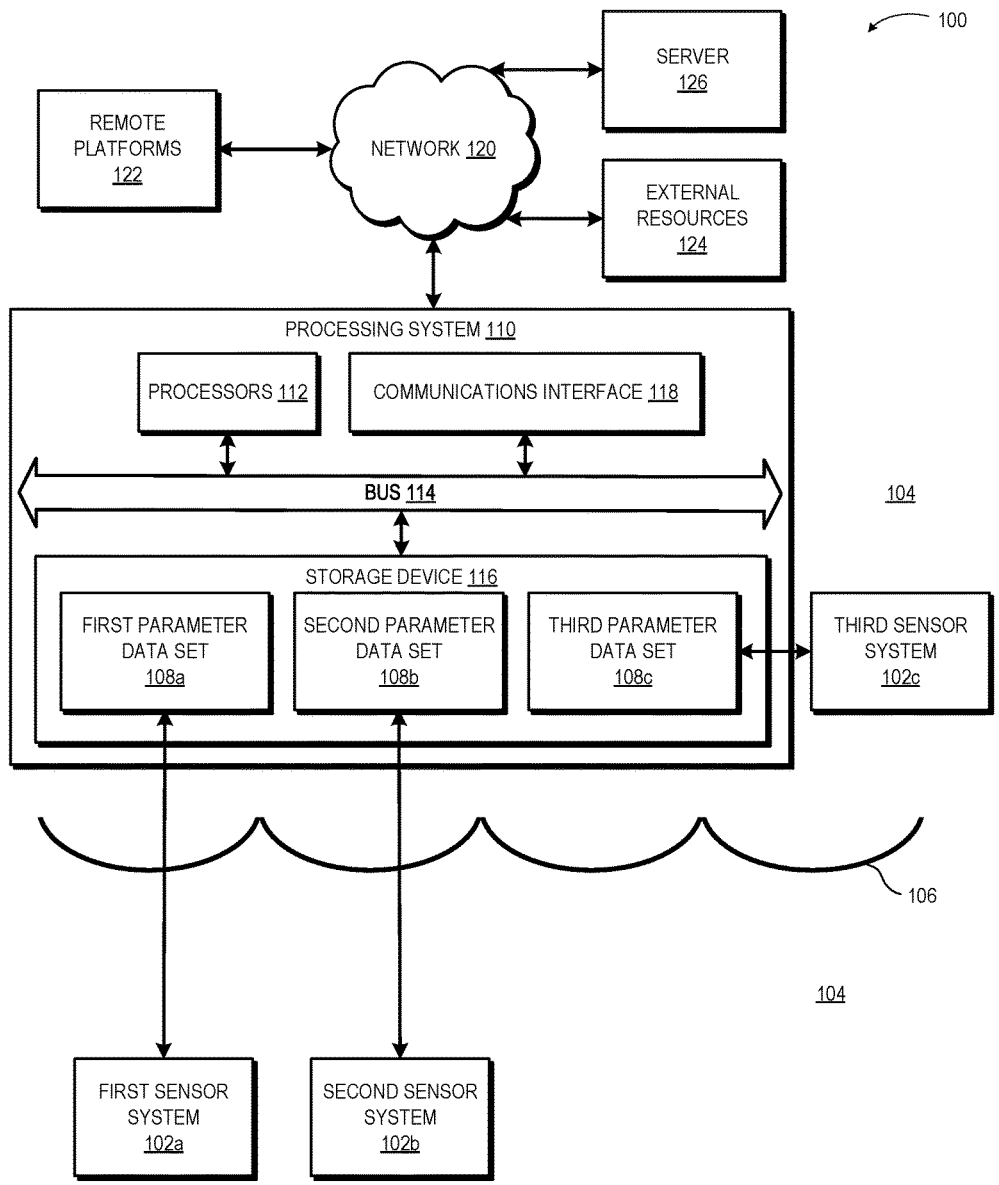
FIG. 1 is a diagram illustrating a system for implementing consensus biomass estimation in accordance with some embodiments.

In animal husbandry, farmers theoretically aim for the highest growth rate possible, using the least amount of feed to produce the best quality output. Typically, aquaculture refers to the cultivation of fish, shellfish, aquatic plants, and the like through husbandry efforts for seafood markets and human consumption. Feed conversion ratio (FCR) is a ratio or rate measuring the efficiency with which the bodies of animals convert animal feed into a desired output. With dairy cows, for example, the desired output is milk, whereas in animals raised for meat (e.g., beef cows, pigs, chickens, fish, shrimp, shellfish, and the like) the desired output is flesh/meat. In particular, the feed conversion ratio is the ratio of inputs to outputs (e.g., mass of feed provided per body mass gained by an animal). In some industries, the efficiency of converting feed into the desired output is represented as feed efficiency (FE), which is the output divided by the input (i.e., inverse of FCR).

Effective farm management benefits from accurate information regarding animal biomass in order to monitor feed conversion, control feeding regimes, stocking densities, and optimum timing for harvesting of animal stock. Conventionally, animal farming companies employ various strategies for animal biomass determination, such as by manually weighing reared animals using mechanical or electronic scales. Such manual practices are labor-intensive, time-consuming, and often detrimental to welfare (e.g., stress inducing) of animals due to physical handling of animals. Additionally, manual weight determination techniques are often too slow for high-throughput farming operations where many measurements are required, where stocking densities are sufficiently high, and/or for weighing animals such as cows and horses where sheer body mass renders manual measurements difficult. In particular, direct physical measurement of animals is often difficult such as due to its size scale, quantity of measurements to be taken, and the like. Farming operations increasingly deploy non-contact, sensor-based biomass determination systems for performing analyses on sensor data (e.g., images and the like) related to animal measurements (such as body measurements extracted from image data) and predicting an animal's weight.

However, the performance of such non-contact biomass estimation by sensor systems will have various inherent uncertainties or inaccuracies in their performance due to, for example, the nature of the environments in which they are deployed. Existing image analysis systems have insufficient weight prediction accuracy, image capture reliability, and feature extraction reliability, particularly in farming or livestock-handling environments where sensor data capture conditions are variable (such as non-uniform lighting). For example, aquaculture stock is, with few exceptions, often held underwater and therefore more difficult to observe than animals and plants cultured on land. Further, aquaculture is commonly practiced in open, outdoor environments and therefore exposes farmed animals, farm staff, and farming equipment to factors that are, at least partially, beyond the control of operators. Such factors include, for example, variable and severe weather conditions, changes to water conditions, turbidity, interference with farm operations from predators, and the like.

To improve the precision and accuracy of biomass estimation and decrease uncertainties associated with conventional biomass measurement systems, FIGS. 1-9 describe techniques for providing a consensus biomass estimation that includes providing a first biomass parameter data set associated with a first biomass attribute parameter to a first biomass estimation model and providing a second biomass parameter data set associated with a second biomass attribute parameter is provided to a second biomass estimation model different from the first biomass estimation model. The first biomass estimation model is adaptively weighted with a first weighting factor relative to a second weighting factor for the second biomass estimation model. An aggregated biomass estimate is determined based on a combination of the first biomass estimation model using the first weight factor and the second biomass estimation model using the second weight factor. In this manner, different biomass estimations from different biomass estimation models are adaptively weighted and combined into an aggregated biomass estimate that is more accurate than would be individually provided by each biomass estimation model by itself.

FIG. 1 is a diagram of a system 100 for implementing biomass estimation in accordance with some embodiments. In various embodiments, the system 100 includes a plurality of sensor systems 102 that are each configured to monitor and generate data associated with the environment 104 within which they are placed. As shown, the plurality of sensor systems 102 includes a first sensor system 102a positioned below the water surface 106 and including a first set of one or more sensors. The first set of one or more sensors are configured to monitor the environment 104 below the water surface 106 and generate data associated with a first biomass attribute parameter. It will be appreciated that biomass attribute parameters, in various embodiments, include one or more parameters corresponding to the environment 104 within which the one or more sensors are positioned and may be measured (or otherwise captured and detected) to generate parameter data sets 108 to be used in biomass estimation models. Accordingly, in some embodiments, the first sensor system 102a generates a first parameter data set 108a and communicates the first parameter data set 108a to a processing system 110 for storage, processing, and the like.

As used herein, the term "biomass" refers to any representation (e.g., including both quantitative and qualitative) or other description of a parameter (which may be based on sensor measurements, derived from sensor measurements, and the like) for describing an amount of animal mass in a given area, biotic community, habitat, population, or sample. It should be recognized that measures of biomass are not limited to any particular expression or dimension and may include any representation including but not limited to weight of an individual animal, mean weight of animals in a population, median weight of animals in a population, weight distribution of animals in a population, cumulative total weight of animals per unit area/volume, number of animals per unit area/volume, body size of an animal, body size average of animals in a population, body size variation of animals in a population, body size distribution, body shape, vertical distribution of animal densities (e.g., fish within a water column), vertical animal size stratification, horizontal distribution of animal densities (e.g., flock of chickens on barn floor), and the like.

Similarly, as used herein, the term "biomass attribute" refers to any representation (e.g., including both quantitative and qualitative) or other description of a parameter (which may be based on sensor measurements, derived from sensor measurements, input based on human observations, and the like) from which the biomass of one or more animals (or one or more body parts/sections of individual animals) may be estimated or is otherwise indicative of biomass. It should be recognized that biomass attributes are not limited to any particular expression and may include any number and any combination of parametric representations including but not limited to distance (e.g., length) between key morphological features of an animal (e.g., transect lines in lateral views, posterior views, anterior views, and the like), various body circumferential measurements, various body curvature measurements, various body volumetric measurements, body composition measurements, various morphological parameters, and the like.

For example, in some embodiments, biomass attributes in the context of finfish include, but is not limited to, total length (e.g., length of a fish as measured from tip of the snout to tip of the longer lobe of caudal fin, often expressed as a straight-line measure and not over the curve of the body), standard length (e.g., length of a fish as measured from tip of the snout to the posterior end of the last vertebra, thereby excluding length of the caudal fin), fork length (e.g., length of a fish as measured from tip of the snout to the end of the middle caudal fin rays), one or more transects of a truss network between key morphological features of a fish (e.g., lateral distance between a center of an eye and the original of the dorsal fin), body depth along one or more portions of a fish (e.g., lateral distance between dorsal and ventral body portions, such as lateral distance of fish body at end of dorsal fin), body girth around one or more portions of a fish (e.g., contouring measurement around a circumference of the body, such as around a fattest portion, a thinnest portion, and around the fish at one or more body depth transect lines), and the like.

Although described above in the context of image-related biomass attributes for ease of description, those skilled in the art will recognize that biomass attributes are not limited to such contexts and includes any measurement contribution from a physical setting from which biomass may be estimated or is otherwise indicative of biomass. In various embodiments, biomass attributes in the context of finfish also include, but is not limited to, sound pulse reflections, returning acoustic echo signals, background noise data, water attenuation data, acoustic target strength of one or more animals, volume-backscattering strength from a population of animals, acoustic scattering data, acoustic data across various frequencies, transect pattern data regarding animal data capture, and the like.

In some embodiments, biomass attributes in the context of livestock animals include, but is not limited to, body contour measurements, point cloud data (PCD), hip height, withers height, hips distance, head size, body girth around one or more portions of a fish (e.g., contouring measurement around a circumference of the body, such as around the chest, around the heart, and around the animal at one or more body depth transect lines), body depth along one or more portions of an animal (e.g., chest depth), chest width (e.g., body depth along frontal view), abdominal width, rump width, one or more transects of a truss network between key morphological features in one or more views, body length (e.g., distance between base of ears and to the base of the tail), depth data corresponding to animal positions, water displacement, and the like.

Those skilled in the art will recognize that this discussion of example representations of biomass (e.g., different representations of how to quantify and present biomass information) and biomass attributes is provided only for illustrative purposes to give a concrete example of the weighting and biomass estimation operations discussed herein. However, any of a variety of biomass representations and/or biomass attributes may be implemented for generating consensus biomass estimations, as described in more detail below.

The plurality of sensor systems 102 also includes a second sensor system 102b positioned below the water surface 106 and including a second set of one or more sensors. The second set of one or more sensors are configured to monitor the environment 104 below the water surface 106 and generate data associated with a second biomass attribute parameter. It will be appreciated that biomass attribute parameters, in various embodiments, include one or more parameters corresponding to the environment 104 within which the one or more sensors are positioned and may be measured (or otherwise captured and detected) to generate parameter data sets 108 to be used in biomass estimation models. Accordingly, in some embodiments, the second sensor system 102b generates a second parameter data set 108b and communicates the second parameter data set 108b to the processing system 110 for storage, processing, and the like. It should be recognized that the plurality of sensor systems 102 are not limited to being positioned under the water surface 106. In some embodiments, the plurality of sensor systems 102 also includes a third sensor system 102c positioned at or above the water surface 106 and including a third set of one or more sensors. The third set of one or more sensors are configured to monitor the environment 104 at or above the water surface 106 and generate data associated with a third biomass attribute parameter. Accordingly, in some embodiments, the third sensor system 102c generates a third parameter data set 108c and communicates the third parameter data set 108c to the processing system 110 for storage, processing, and the like.

The processing system 110 includes one or more processors 112 coupled with a communications bus 114 for processing information. In various embodiments, the one or more processors 112 include, for example, one or more general purpose microprocessors or other hardware processors. The processing system 110 also includes one or more storage devices 116 communicably coupled to the communications bus 114 for storing information and instructions. For example, in some embodiments, the one or more storage devices 116 includes a magnetic disk, optical disk, or USB thumb drive, and the like for storing information and instructions. In various embodiments, the one or more storage devices 116 also includes a main memory, such as a random-access memory (RAM), cache and/or other dynamic storage devices, coupled to the communications bus 114 for storing information and instructions to be executed by the one or more processors 112. The main memory may be used for storing temporary variables or other intermediate information during execution of instructions to be executed by the one or more processors 112. Such instructions, when stored in storage media accessible by the one or more processors 112, render the processing system 110 into a special-purpose machine that is customized to perform the operations specified in the instructions. By way of non-limiting example, in various embodiments, the processing system 110 may be any computer system, such as a workstation, desktop computer, server, laptop, handheld computer, tablet computer, mobile computing or communication device, or other form of computing or telecommunications device that is capable of communication and that has sufficient processor power and memory capacity to perform the operations described herein.

The processing system 110 also includes a communications interface 118 communicably coupled to the communications bus 114. The communications interface 118 provides a multi-way data communication coupling configured to send and receive electrical, electromagnetic or optical signals that carry digital data streams representing various types of information. In various embodiments, the communications interface 118 provides data communication to other data devices via, for example, a network 120. For example, in some embodiments, the processing system 110 may be configured to communicate with one or more remote platforms 122 according to a client/server architecture, a peer-to-peer architecture, and/or other architectures via a network 116. Remote platform(s) 122 may be configured to communicate with other remote platforms via the processing system 110 and/or according to a client/server architecture, a peer-to-peer architecture, and/or other architectures via the network 116. Users may access system 100 via remote platform(s) 122.

A given remote platform 122 may include one or more processors configured to execute computer program modules. The computer program modules may be configured to enable a user associated with the given remote platform 122 to interface with system 100 and/or external resources 124, and/or provide other functionality attributed herein to remote platform(s) 122. External resources 122 may include sources of information outside of system 100, external entities participating with system 100, and/or other resources. In some implementations, some or all of the functionality attributed herein to external resources 122 may be provided by resources included in system 100.

In some embodiments, the processing system 110, remote platform(s) 122, and/or one or more external resources 124 may be operatively linked via one or more electronic communication links. For example, such electronic communication links may be established, at least in part, via the network 120. It will be appreciated that this is not intended to be limiting, and that the scope of this disclosure includes implementations in which computing platform(s) 102, remote platform(s) 104, and/or external resources 122 may be operatively linked via some other communication media. Further, in various embodiments, the processing system 110 is configured to send messages and receive data, including program code, through the network 120, a network link (not shown), and the communications interface 118. For example, a server 126 may be configured to transmit or receive a requested code for an application program through via the network 120, with the received code being executed by the one or more processors 112 as it is received, and/or stored in storage device 116 (or other non-volatile storage) for later execution.

In various embodiments, the processing system 110 receives one or more of the parameter data sets 108 and stores the parameter data sets 108 at the storage device 116 for processing. As described in more detail below with respect to FIGS. 2-9, the processing system 110 provides a first biomass attribute parameter data set (e.g., first parameter data set 108a) to a first biomass estimation model and further provides a second biomass attribute parameter data set (e.g., second parameter data set 108b) to a second biomass estimation model different from the first biomass estimation model. In various embodiments, the first biomass estimation model receives a data set corresponding to measurements for at least a first biomass attribute parameter related to biomass estimation. Similarly, the second biomass estimation model receives a data set corresponding to measurements for at least a second biomass attribute parameter related to biomass estimation. By way of non-limiting example, in some embodiments, a biomass attribute parameter describes body length measurements of fish within the water below the water surface 106.

Data corresponding to such a biomass attribute parameter may be utilized as input by a biomass estimation model to generate a description of one or more biomass-related metrics (i.e., a biomass estimation). Subsequently, the processing system 110 adaptively weights the first biomass estimation model with a first weighting factor relative to a second weighting factor for the second biomass estimation model in order to determine an aggregated biomass estimate based on a combination of the first biomass estimation model using the first weight factor and the second biomass estimation model using the second weight factor. In this manner, the processing system 110 provides a weighting to different biomass estimates from different biomass estimation models and combines them into an aggregated biomass estimate that is more accurate than would be individually provided by each biomass estimation model by itself.

As will be appreciated by those skilled in the art, sensor systems capturing data for biomass estimation also experience various inherent uncertainties or inaccuracies in their performance similar to physically handling a subset of an animal population due to, for example, the nature of the environments in which they are deployed. In the context of underwater finfish, sampling a number of individuals that is less than the entirety of an entire population is likely to result in biased sampling. For example, when sampling a population for estimating a biomass metric (e.g., estimating a trait such as average size of individual fish in the whole population), biased sampling may occur due to chance effects where small and/or large individuals are overrepresented by chance. Similarly, animals of different sizes within the population size distribution may not be equally distributed within the rearing enclosure, thereby oversampling individuals positioned closer to sensor systems and undersampling individuals positioned away or imperceptible by sensor systems (as many sensors such as image cameras do not see the entirety of the rearing enclosures). These types of sampling errors result in decreased accuracy and precision of biomass estimates, particularly with populations with increased within-population variations and with smaller sampling sizes.

As described in more detail below with respect to FIGS. 2-9, by assigning weight factors to the biomass estimation models and their respective biomass estimations, the system influences the biomass attribute parameters utilized and therefore combine the biomass attribute parameters in an advantageous way. The resulting aggregated biomass estimate therefore indicates for multiple biomass attribute parameters and biomass estimation models and may have an improved biomass estimation accuracy. For example, using multiple biomass estimations from multiple sources and combining them in an optimal way based on a validation and comparison of model parameters with reference data (e.g., weather data, weather forecasts, environmental conditions, and more as discussed in further detail below) provides a biomass estimate with an increased accuracy by accounting for relative relevance of available data under various conditions.

In various embodiments, the system 100 also includes a feed control system (not shown) that receives a feed instruction signal (such as feeding instruction signals based on biomass triggered instruction signals 310 and 810 described in more detail below with respect to FIGS. 3 and 8) for modifying and/or guiding the operations (e.g., dispensing of feed related to meal size, feed distribution, meal frequency, feed rate, feed composition, etc.) of feeding systems including automatic feeders, feed cannons, and the like. It should be recognized that the feed instruction signal is not limited to any particular format and may include any representation including but not limited to feeding instructions, user interface alerts, and the like. As will be appreciated, in various embodiments, users and operators may be capable of modifying their feeding strategy manually based on the feed instruction signal. For example, in some embodiments, the operator may provide fewer feed pellets when the feed instruction signal provides a signal that individual and/or cumulative population biomass is low, such as via graphical user interface (GUI) displays, audible and visual alerts, and the like. In other embodiments, the feed instruction signal may be provided to an automatic feeder for controlling feeding operations in a manner that reduces or eliminates manual, human intervention. Accordingly, various parameters such as feeding rate, feeding amount, feeding frequency, feeding timing, and the like may be modified based on the feeding instruction signal.

Figure 2:
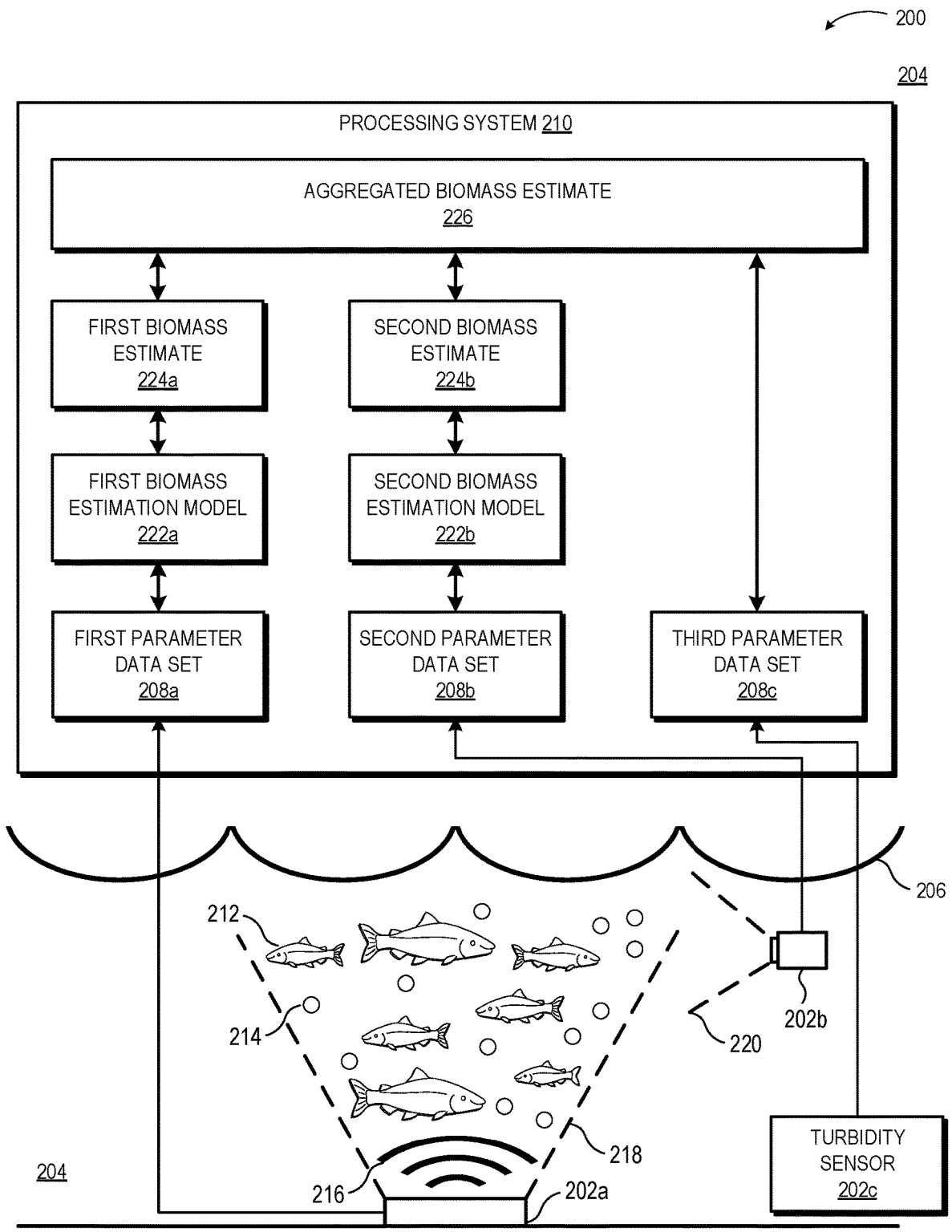
FIG. 2 is a diagram illustrating a biomass estimation system implementing two sets of different underwater sensors in accordance with some embodiments.

Referring now to FIG. 2, illustrated is a diagram showing a system 200 implementing two sets of different underwater sensors in accordance with some embodiments. In various embodiments, the system 200 includes a plurality of sensor systems 202 that are each configured to monitor and generate data associated with the environment 204 within which they are placed. As shown, the plurality of sensor systems 202 includes a first sensor system 202a positioned below the water surface 206 and including a first set of one or more sensors. The first set of one or more sensors are configured to monitor the environment 204 below the water surface 206 and generate data associated with a first biomass attribute parameter. In particular, the first sensor system 202a of FIG. 2 includes one or more acoustic sensors configured to observe fish behavior and capture measurements associated with biomass attribute parameters. For example, in various embodiments, the acoustic sensors are configured to capture acoustic data corresponding to the presence (or absence), abundance, distribution, size, and behavior of underwater objects (e.g., a population of fish 212 as illustrated in FIG. 2).

Such acoustic data measurements may, for example, measure intensity of acoustic reflectivity of ensonified objects(s) (e.g., fish) within the water to be used as an approximation of biomass. As used herein, it should be appreciated that an "object" refers to any stationary, semi-stationary, or moving object, item, area, or environment in which it may be desired for the various sensor systems described herein to acquire or otherwise capture data of. For example, an object may include, but is not limited to, one or more fish, crustacean, feed pellets, predatory animals, and the like. However, it should be appreciated that the sensor measurement acquisition and analysis systems disclosed herein may acquire and/or analyze sensor data regarding any desired or suitable "object" in accordance with operations of the systems as disclosed herein.

In various embodiments, the one or more acoustic sensors of the first sensor system 202a includes one or more of a passive acoustic sensor and/or an active acoustic sensor (e.g., an echo sounder and the like) for remotely detecting and identifying objects. Passive acoustic sensors generally listen for remotely generated sounds (e.g., often at specified frequencies or for purposes of specific analyses, such as for detecting fish or feed in various aquatic environments) without transmitting into the underwater environment 204. In various embodiments, many species of fishes and other animals produce sounds naturally in various conditions, with the produced sounds indicative of various fish behaviors, fish abundance, and also other biomass attributes. It should be noted that the sounds of many species are not produced continuously but rather at specific times, such as more commonly at night or during periods of specific behavioral activities such as feeding. Active acoustic sensors are conventionally include both an acoustic receiver and an acoustic transmitter that transmit pulses of sound (e.g., pings) at one or more frequencies into the surrounding environment 204 and then listens for reflections (e.g., echoes) of the sound pulses for remotely detecting targets.

It is noted that as sound waves/pulses travel through water, it will encounter objects having differing densities or acoustic properties than the surrounding medium (i.e., the underwater environment 204) that reflect sound back towards the active sound source(s) utilized in active acoustic systems. For example, sound travels differently through fish 212 (and other objects in the water such as feed pellets 214) than through water (e.g., a fish's air-filled swim bladder has a different density than water). Accordingly, differences in reflected sound waves from active acoustic techniques due to differing object densities may be accounted for in the detection of aquatic life and estimation of their individual sizes or total biomass. It should be recognized that although specific sensors are described below for illustrative purposes, various acoustic sensors may be implemented in the systems described herein without departing from the scope of this disclosure.

In various embodiments, the first sensor system 202a utilizes active sonar systems in which pulses of sound are generated using a sonar projector including a signal generator, electro-acoustic transducer or array, and the like. The active sonar system may further include a beamformer (not shown) to concentrate the sound pulses into an acoustic beam 216 covering a certain search angle 218. In some embodiments, the first sensor system 202a measures distance through water between two sonar transducers or a combination of a hydrophone (e.g., underwater acoustic microphone) and projector (e.g., underwater acoustic speaker). The first sensor system 202a includes sonar transducers (not shown) for transmitting and receiving acoustic signals (e.g., pings). To measure distance, one transducer (or projector) transmits an interrogation signal and measures the time between this transmission and the receipt of a reply signal from the other transducer (or hydrophone). The time difference, scaled by the speed of sound through water and divided by two, is the distance between the two platforms. This technique, when used with multiple transducers, hydrophones, and/or projectors calculates the relative positions of objects in the underwater environment 204.

In other embodiments, the first sensor system 202a includes an acoustic transducer configured to emit sound pulses into the surrounding water medium. Upon encountering objects that are of differing densities than the surrounding water medium (e.g., the fish 212), those objects reflect back a portion of the sound (sometimes referred to as the echo signal) towards the sound source (i.e., the acoustic transducer). Due to acoustic beam patterns, identical targets at different azimuth angles will return different echo levels. Accordingly, if the beam pattern and angle to a target is known, this directivity may be compensated for. In various embodiments, split-beam echosounders divide transducer faces into multiple quadrants and allow for location of targets in three dimensions. Similarly, multi-beam sonar projects a fan-shaped set of sound beams outward from the first sensor system 202a and record echoes in each beam, thereby adding extra dimensions relative to the narrower water column profile given by an echosounder. Multiple pings may thus be combined to give a three-dimensional representation of object distribution within the water environment 204.

In some embodiments, the one or more acoustic sensors of the first sensor system 202a includes a Doppler system using a combination of cameras and utilizing the Doppler effect to monitor the biomass of salmon in sea pens. The Doppler system is located underwater and incorporates a camera, which is positioned facing upwards towards the water surface 206. In various embodiments, there is a further camera integrated in the transmission device normally positioned on the top-right of the pen, monitoring the surface of the pen. The sensor itself uses the Doppler effect to differentiate pellets from fish. The sensor produces an acoustic signal and receives the echo. The sensor is tuned to recognize pellets and is capable of transmitting the information by radio link to the feed controller over extended distances. The user watches the monitor and determines when feeding should be stopped. Alternatively, a threshold level of waste pellets can be set by the operator, and the feeder will automatically switch off after the threshold level is exceeded.

In other embodiments, the one or more acoustic sensors of the first sensor system 202a includes an acoustic camera having a microphone array (or similar transducer array) from which acoustic signals are simultaneously collected (or collected with known relative time delays to be able to use phase different between signals at the different microphones or transducers) and processed to form a representation of the location of the sound sources. In various embodiments, the acoustic camera also optionally includes an optical camera. It will be appreciated that various characteristics of echo signals (or other return signal to the active acoustic receiver) strength include biomass attributes that are correlated to, for example, fish count, total biomass, and the like.

Additionally, as illustrated in FIG. 2, the plurality of sensor systems 202 includes a second sensor system 202b positioned below the water surface 206 and including a second set of one or more sensors. The second set of one or more sensors are configured to monitor the environment 204 below the water surface 206 and generate data associated with a second biomass attribute parameter. In particular, the second sensor system 202b of FIG. 2 includes one or more imaging sensors configured to observe fish behavior and capture measurements associated with biomass attribute parameters related to fish biomass. In various embodiments, the imaging sensors are configured to capture image data corresponding to, for example, the presence (or absence), abundance, distribution, size, and behavior of underwater objects (e.g., a population of fish 212 as illustrated in FIG. 2). In various embodiments, such captured image data is processed to extract various measurements corresponding to biomass attributes (e.g., various image-related biomass attributes such as previously described with respect to FIG. 1). It should be recognized that although specific sensors are described below for illustrative purposes, various imaging sensors may be implemented in the systems described herein without departing from the scope of this disclosure.

In some embodiments, the imaging sensors of the second sensor system 202b includes one or more cameras configured to capture still images and/or record moving images (e.g., video data). The one or more cameras are directed towards the surrounding environment 204 below the water surface 206, with each camera capturing a sequence of images (e.g., video frames) of the environment 204 and any objects in the environment. In various embodiments, each camera has a different viewpoint or pose (i.e., location and orientation) with respect to the environment. Although FIG. 2 only shows a single camera for ease of illustration and description, persons of ordinary skill in the art having benefit of the present disclosure should appreciate that the second sensor system 202b can include any number of cameras and which may account for parameters such as each camera's horizontal field of view, vertical field of view, and the like. Further, persons of ordinary skill in the art having benefit of the present disclosure should appreciate that the second sensor system 202b can include any arrangement of cameras (e.g., cameras positioned on different planes relative to each other, single-plane arrangements, spherical configurations, and the like).

In various embodiments, the imaging sensors of the second sensor system 202b includes a first camera (or lens) having a particular field of view 220 as represented by the dashed lines that define the outer edges of the camera's field of view that images the environment 204 or at least a portion thereof. For the sake of clarity, only the field of view 220 for a single camera is illustrated in FIG. 2. In various embodiments, the imaging sensors of the second sensor system 202b includes at least a second camera having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 220 of the first camera of the second sensor system 202b may, in some embodiments, overlap with the fields of view of two other cameras to form an overlapping field of view with three different perspectives of the environment 204.

In some embodiments, the imaging sensors of the second sensor system 202b includes one or more light field cameras configured to capture light field data emanating from the surrounding environment 204. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the second sensor system 202b includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras. However, it should be recognized that the operations described herein may similarly be implemented with any type of imaging sensor without departing from the scope of this disclosure. For example, in various embodiments, the imaging sensors of the second sensor system 202 may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyper-spectral cameras, thermal cameras, other machine vision systems that are operable along various portions of the electromagnetic spectrum (including visible light, infrared, and other bands), sonar cameras (e.g., DIDSON and ARTS sonar cameras), and the like.

Additionally, as illustrated in FIG. 2, the plurality of sensor systems 202 includes a third sensor system 202c positioned below the water surface 206 and including a third set of one or more sensors. The third set of one or more sensors are configured to monitor the environment 204 below the water surface 206 and generate data associated with a reference parameter. In particular, the third sensor system 202c of FIG. 2 includes one or more environmental sensors configured to capture measurements associated with the environment 204 within which the system 200 is deployed. As described in further detail below, in various embodiments, the environmental sensors of the third sensor system 202c generate environmental data that serves as reference data for implementing the dynamic weighting of various estimates from a plurality of biomass estimation models.

For example, in one embodiment, the environmental sensors of the third sensor system 202c includes a turbidity sensor configured to measure an amount of light scattered by suspended solids in the water. Turbidity is a measure of the degree to which water (or other liquids) changes in level of its transparency due to the presence of suspended particulates (e.g., by measuring an amount of light transmitted through the water). In general, the more total suspended particulates or solids in water, the higher the turbidity and therefore murkier the water appears. As will be appreciated, a variable parameter such as variance in the turbidity of a liquid medium will affect the accuracy of image-based measurements and accordingly the accuracy of prediction models that consume such images as input. Accordingly, by measuring turbidity as a reference parameter, the detected intensity of turbidity measurements may be utilized as a basis for determining a weighting that an image-based prediction model should be given relative to other non-image based prediction models, as described in more detail below. It should be recognized that although FIG. 2 is described in the specific context of a turbidity sensor, the third sensor system 202c may include any number of and any combination of various environmental sensors without departing from the scope of this disclosure.

The first sensor system 202a and the second sensor system 202b each generate a first biomass attribute parameter data set 208a and a second biomass attribute parameter data set 208b, respectively. In the context of FIG. 2, the first biomass attribute parameter includes acoustic data. Such acoustic data may include any acoustics-related value or other measurable factor/characteristic that is representative of at least a portion of a data set that describes the presence (or absence), abundance, distribution, size, and/or behavior of underwater objects (e.g., a population of fish 212 as illustrated in FIG. 2). For example, the acoustic data may include acoustic measurements indicative of the relative and/or absolute locations of individual fish of the population of fish 212 within the environment 204. Similarly, the acoustic data may include acoustic measurements corresponding to target strength of fish and indicative of biomass.

In some embodiments, the acoustic data includes biomass data for estimating individual fish sizes based on measured target strength using, for example, backscattering cross section of individual fish, or other target strength estimation methodologies. This allows estimation of fish sizes using fish target strength versus length relationships. Similarly, in various embodiments, acoustic data also include biomass data for estimating total fish biomass based on measurements of fish density and density distribution using various echo integration methodologies, such as estimating extinction cross section of fish measured from attenuation of sound waves by fish aggregation. It should be recognized that although the first biomass attribute parameter has been abstracted and described here generally as "acoustic data" for ease of description, those skilled in the art will understand that acoustic data (and therefore the first biomass attribute parameter data set 208a corresponding to the acoustic data) may include, but is not limited to, any of a plurality of acoustics measurements corresponding to one or more biomass attributes, acoustic sensor specifications, operational parameters of acoustic sensors, and the like.

In the context of FIG. 2, the second biomass attribute parameter includes image data. Such image data may include any image-related value or other measurable factor/characteristic that is representative of at least a portion of a data set that describes the presence (or absence), abundance, distribution, size, and/or behavior of underwater objects (e.g., a population of fish 212 as illustrated in FIG. 2). For example, the image data may include camera images capturing data related to one or more biomass attributes of individual fish of the population of fish 212 within the environment 204.

It should be recognized that although the second biomass attribute parameter has been abstracted and described here generally as "image data" for ease of description, those skilled in the art will understand that image data (and therefore the second biomass attribute parameter data set 208b corresponding to the image data) may include, but is not limited to, any of a plurality of image frames corresponding to one or more biomass attributes, extrinsic parameters defining the location and orientation of the image sensors (such as relative to the imaged objects, other sensors such as the first sensor system 202a, and the like), intrinsic parameters that allow a mapping between camera coordinates and pixel coordinates in an image frame, camera models, operational parameters of the image sensors (e.g., shutter speed), depth maps, and the like.

In various embodiments, such as in the context of FIG. 2, the reference parameter includes environmental data. Such environmental data may include any measurement representative of the environment 204 within which the environmental sensors are deployed. For example, the environmental data (and therefore the reference parameter data set 208c corresponding to the environmental data) may include, but is not limited to, any of a plurality of water turbidity measurements, water temperature measurements, metocean measurements, weather forecasts, air temperature, dissolved oxygen, current direction, current speeds, and the like.

In various embodiments, the processing system 210 receives one or more of the data sets 208 (e.g., first biomass attribute parameter data set 208a, the second biomass attribute parameter data set 208b, and the reference parameter data set 208c) via, for example, wired-telemetry, wireless-telemetry, or any other communications links for processing. The processing system 210 provides the first biomass attribute parameter data set 208a to a first biomass estimation model 222a. The processing system 210 also provides the second biomass attribute parameter data set 208b to a second biomass estimation model 222b different from the first biomass estimation model 222a. In various embodiments, the first biomass estimation model 222a receives the acoustic data of the first biomass attribute parameter data set 208a as input and generates a first biomass estimate 224a.

By way of non-limiting example, in some embodiments, the first biomass estimation model 222a utilizes acoustic data related to target strength of ensonified fish within the water below the water surface 206 as a proxy for biomass (as biomass is a value which is difficult to directly measure without physically handling the fish) in generating the first biomass estimate 224a. In various embodiments, such as described below in more detail with respect to FIG. 3, the first biomass estimate 224a generated by the first biomass estimation model 222a is represented as a numerical weight within a numerical system. However, those skilled in the art will recognize that such a numerical representation of biomass and biomass estimation is provided as a non-limiting example for ease of illustration. As used herein, the term "biomass estimation" refers to any representation (e.g., including both quantitative and qualitative) or other description of a parameter (which may be based on sensor measurements, derived from sensor measurements, input based on human observations, and the like).

Figure 8:
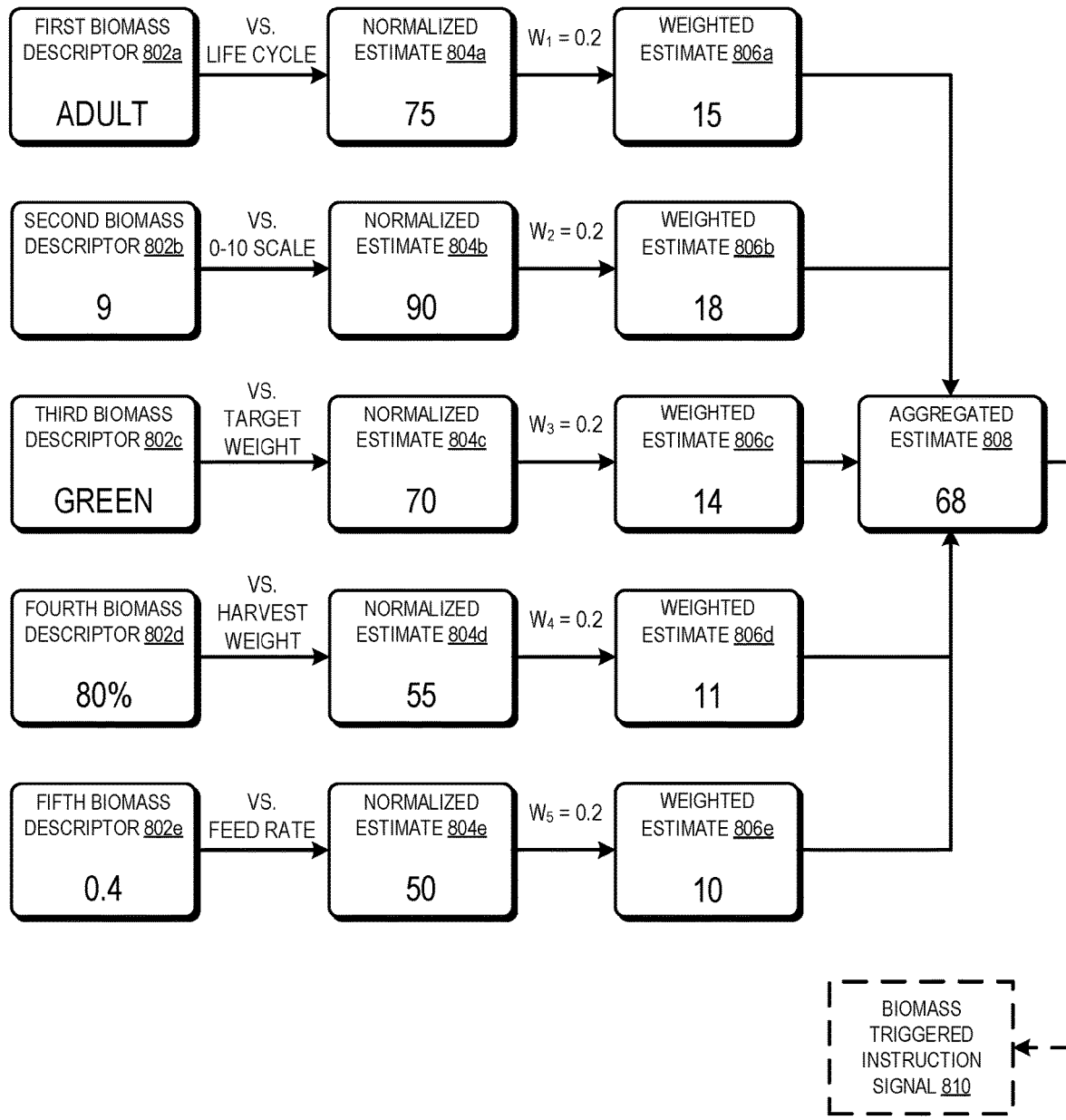
FIG. 8 is a block diagram illustrating a second example of adaptive weighting of biomass estimates in accordance with some embodiments

Additionally, it should be recognized that a "biomass estimate" is not limited to the output of biomass models and in some embodiments may include, for example, human-based inputs such as textual entries in a spreadsheet indicating size or lifecycle status (e.g., fry vs. smolt vs. adult), numerical descriptors of fish size (e.g., biomass ranking on a 0-10 scale based on human personal experience such as biomass estimation 802b of FIG. 8), and the like. In other embodiments, such as described below in more detail with respect to FIG. 8, a "biomass estimate" may also include (model-based-output or otherwise) a raw numerical quantification without any relation to a baseline reference (e.g., biomass estimation 802a), a color-coded descriptor (e.g., biomass estimation 802c), a percentage quantification of total biomass that have reached a threshold size for harvesting (e.g., biomass exceeding 4 kilograms per individual and therefore ready to be harvested, such as biomass estimation 802d), instructions to change feeding rate or total amount (e.g., biomass estimation 802e), and the like.

Further, it should be noted that although the various operations are primarily described here in the context of estimating biomass for a current time period (e.g., in real-time or near real-time), the operations described herein may similarly be applied to biomass estimation or description for a prior time period or a future time period without departing from the scope of this disclosure. Accordingly, as used herein, a "forecast" or "prediction" (e.g., in the context of biomass) refers to describing, either qualitatively or quantitatively, any proxy related to estimated level of biomass.

The processing system 210 also provides the second biomass attribute parameter data set 208b to a second biomass estimation model 222b. In various embodiments, the second biomass estimation model 222b receives the image data of the second biomass attribute parameter data set 208b as input and generates a second biomass estimate 224b. By way of non-limiting example, in some embodiments, the second biomass estimation model 222b utilizes image data containing measurements related to one or more biomass attributes of individual fish (or with respect to two or more fish) for generating the second biomass estimate 224b. In various embodiments, the second biomass estimate 224b is a numerical description of a body weight of an individual fish. In some embodiments, the second biomass estimate 224b is a numerical description of an average body weight for fish within the population of fish 212.

Subsequently, the processing system 210 adaptively weights the first biomass estimate 224a of the first biomass estimation model 222a with a first weighting factor relative to a second weighting factor for a second biomass estimate 224b of the second biomass estimation model 222b in order to determine an aggregated biomass estimate 226 based on a combination of the first biomass estimation model 222a using the first weight factor and the second biomass estimation model 222b using the second weight factor. In this manner, and as described in more detail below, the processing system 210 provides a weighting to different biomass estimates from different biomass estimation models and combines them into an aggregated biomass estimate 226 that is more accurate than would be individually provided by each biomass estimation model by itself.

Figure 3:
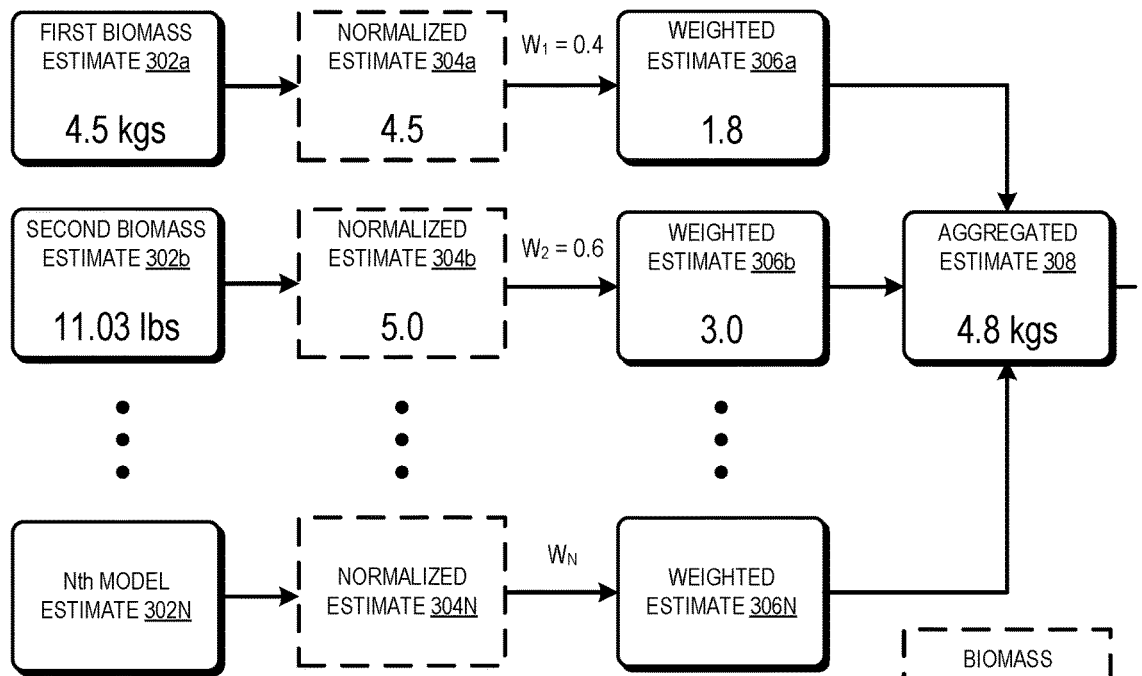
FIG. 3 is a diagram illustrating a first example of adaptive weighting of biomass estimation models in accordance with some embodiments.
Figure 3:
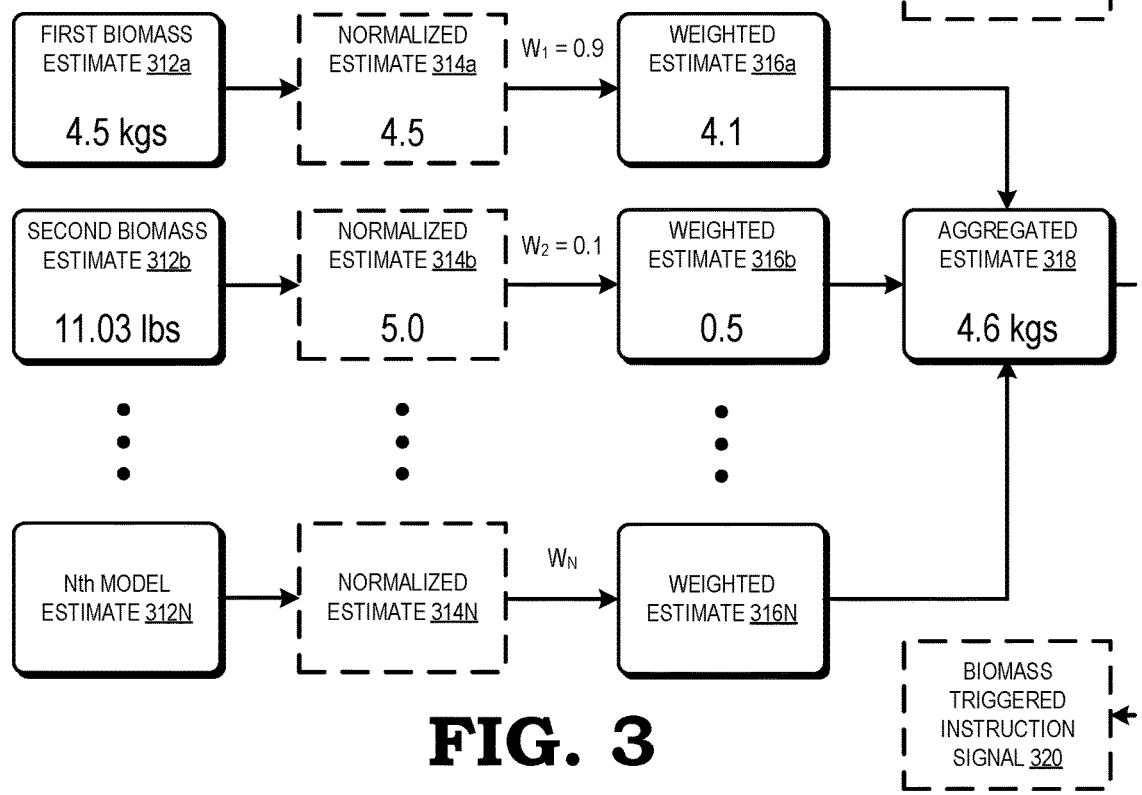

In one embodiment, with respect to FIG. 3 and with continued reference to FIG. 2, a plurality of biomass estimation models (e.g., the first biomass estimation model 222a and the second biomass estimation model 222b) receive their respective inputs (e.g., the biomass attribute parameter data sets 208a and 208b) and generate a plurality of biomass estimates for a number N of different biomass estimation models (not shown) under a first set of environmental conditions in which the weather is sunny, waters are clean, and waves are choppy. As illustrated in FIG. 3, a first biomass estimation model using acoustic data as input (e.g., first biomass estimation model 222a of FIG. 2) generates a first biomass estimation (e.g., first biomass estimate 224a), as represented by a first biomass estimate 302a in FIG. 3. A second biomass estimation model using image data as input (e.g., second biomass estimation model 222b of FIG. 2) generates a second biomass estimation (e.g., second biomass estimate 224b), as represented by a second biomass estimate 302b in FIG. 3.

As illustrated, the first model biomass estimate 302a is 4.5 kgs average fish weight on an example scale and representation of biomass as an average per individual live-body weight of the population of fish 212 in kilogram (kg) units of mass in the metric system. The second model biomass estimate 302b is 11.03 lbs average fish weight on an example scale and representation of biomass as an average per individual live-body weight of the population of fish 212 in pound (lb) units of mass in the imperial system.

As previously discussed in more detail with respect to FIG. 2, the environmental sensors of the third sensor system 202c generate environmental data that serves as reference data for implementing the dynamic weighting of various estimates from a plurality of biomass estimation models. Although the first model biomass estimate 302a and the second model biomass estimate 302b both generally indicate a similar level of estimated biomass, the two biomass estimates are represented in differing unit scales (e.g., metric kilograms versus imperial pounds). Accordingly, in various embodiments, the processing system 210 optionally (as indicated by the dotted lines) normalizes each of the model biomass estimates 302a through 302N to a common biomass representation scale.

For example, as illustrated in FIG. 3, the processing system 210 normalizes the model biomass based on a metric kilogram representation with one decimal place after the decimal point to generate a first normalized model biomass estimate 304a of 4.5 kgs associated with the first model biomass estimate 302a of 4.5 kgs. Similarly, the processing system 210 normalizes the second model biomass estimate 302b of 11.03 lbs based on the same kilogram scale to generate a second normalized model biomass estimate 304b of 5.0 kg. Based on a comparison of the first and second biomass attribute parameter data sets 208a, 208b relative to the measured reference (e.g., environmental) data such as the reference parameter data set 208c, the processing system 210 assigns a first weighting factor $w_1$ of 0.4 to the first biomass estimation model (e.g., the first biomass estimation model 222a of FIG. 2) and its associated first model biomass estimate 302a and first normalized model biomass estimate 304a. Additionally, in this example where N=2 for using two different models in estimating biomass, the processing system 210 also assigns a second weighting factor $w_2$ of 0.6 to the second biomass estimation model (e.g., the second biomass estimation model 222b of FIG. 2) and its associated second model biomass estimate 302b and second normalized model biomass estimate 304b.

The processing system 210 assigns this relative weighting with the first weighting factor $w_1$ of 0.4 for the first biomass estimation model (based on acoustic data) and the second weighting factor $w_2$ of 0.6 for the second biomass estimation model (based on image data) due to a first set of environmental conditions (e.g., using environmental data from the environmental sensors to measure conditions for a current time or to forecast for a future time period) in which the weather is sunny, waters are clean, but waves are choppy. At a high level of abstraction, the processing system 210 determines that the image data captured by the second sensor system 202b (which is positively influenced by, for example, ambient light due to the sunny conditions and clear waters, and also relatively better per animal capture of biomass attribute information) will be of a relatively better quality than the acoustic data captured by the first sensor system 202a (which is negatively influenced by, for example, background sounds due to the choppy waves which decrease the signal-to-noise ratio of acoustic data). Subsequently, the processing system 210 applies the assigned weighting factors $w_1$, $w_2$ to the first normalized model biomass estimate 304a and the second normalized model biomass estimate 304b, respectively, to generate a first weighted model biomass estimate 306a of 1.8 kg and a second weighted model biomass estimate 306b of 3.0. Further, the processing system 210 combines these two weighted model biomass estimates 306a, 306b to generate a weighted, aggregated biomass estimate 308 of 4.8 kg and thereby integrates data from multi-sensor systems to provide a biomass estimate.

In various embodiments, the systems described herein may optionally generate a biomass triggered instruction signal 310 (as represented by the dotted line box) based at least in part on the aggregated biomass estimate 308 that instructs a user and/or one or more farm systems regarding specific actions to be taken in accordance to the biomass estimate (e.g., as quantified by the aggregated biomass estimate 308). For example, in some embodiments, the biomass triggered instruction signal 310 (as represented by the dotted line box) based at least in part on the aggregated biomass estimate 308 that instructs an automated feeding system regarding specific actions to be taken in accordance to the biomass estimate (e.g., change an amount of feed dispensed, change a formulation of feed dispensed, and the like).

It will be appreciated that the biomass triggered instruction signal 310 is not limited to any particular format and in various embodiments may be converted to any appropriate format to be compatible for intended usage, including control signals for modifying operations of feeding systems and display commands for presenting visual directions. Such formats for the biomass triggered instruction signal 310 include, by way of non-limiting example, a stop signal, a color-coded user interface display, a specific feed rate that should be administered, a total feed volume that should be administered, and the like. Additionally, although described above in the context of feeding-related signals, those skilled in the art will recognize that biomass triggered instruction signals are not limited to such contexts and includes any response that may be initiated based at least in part on biomass information such as feed optimization (e.g., changing from a starter feed to a finishing feed, changing feeding rates), harvest actions (e.g., scheduling harvest or pickup of a portion or an entirety of an animal population), animal transfer actions (e.g., transferring from one environment or enclosure to another, sorting animals into different enclosures, culling a subset of the animal population), intervention actions (e.g., scheduling veterinarian visit due to unexpected stall or drop in growth rates), and the like.

As will be appreciated, environmental conditions often vary and the relative accuracy of data gathered by different sensor systems will also vary over time. In another embodiment, with respect to FIG. 3 and with continued reference to FIG. 2, a plurality of biomass estimation models (e.g., the first biomass estimation model 222a and the second biomass estimation model 222b) receive their respective inputs (e.g., the biomass attribute parameter data sets 208a and 208b) and generate a plurality of biomass estimations for a number N of different biomass estimation models (not shown) under a second set of environmental conditions in which the weather is dark (e.g., at dusk or dawn), waters have increased turbidity levels, but waves are calm. As illustrated in FIG. 3, a first biomass estimation model using acoustic data as input (e.g., first biomass estimation model 222a of FIG. 2) generates a first biomass estimate (e.g., first biomass estimate 224a), as represented by a first model biomass estimate 312a in FIG. 3. A second biomass estimation model using image data as input (e.g., second biomass estimation model 222b of FIG. 2) generates a second biomass estimate (e.g., second biomass estimate 224b), as represented by a second model biomass estimate 312b.

As illustrated, the first model biomass estimate 312a is 4.5 kgs average fish weight on an example scale and representation of biomass as an average per individual live-body weight of the population of fish 212 in kilogram (kg) units of mass in the metric system. The second model biomass estimate 312b is 11.03 lbs average fish weight on an example scale and representation of biomass as an average per individual live-body weight of the population of fish 212 in pound (lb) units of mass in the imperial system.

As previously discussed in more detail with respect to FIG. 2, the environmental sensors of the third sensor system 202c generate environmental data that serves as reference data for implementing the dynamic weighting of various estimates from a plurality of biomass estimation models. Although the first model biomass estimate 312a and the second model biomass estimate 312b both generally indicate a similar level of estimated biomass, the two biomass estimates are represented in differing unit scales (e.g., metric kilograms versus imperial pounds). Accordingly, in various embodiments, the processing system 210 optionally (as indicated by the dotted lines) normalizes each of the model biomass estimates 312a through 312N to a common biomass representation scale.

For example, as illustrated in FIG. 3, the processing system 210 normalizes the model biomass based on a metric kilogram representation with one decimal place after the decimal point to generate a first normalized model biomass estimate 314a of 4.5 kgs associated with the first model biomass estimate 312a of 4.5 kgs. Similarly, the processing system 210 normalizes the second model biomass estimate 312b of 11.03 lbs based on the same kilogram scale to generate a second normalized model biomass estimate 314b of 5.0 kg. As previously discussed in more detail with respect to FIG. 2, the environmental sensors of the third sensor system 202c generate environmental data that serves as reference data for implementing the dynamic weighting of various estimates from a plurality of biomass estimation models.

In contrast to the first set of environmental conditions previously described, the second set of environmental conditions describes dark weather (e.g., at dusk or dawn), waters have increased turbidity levels, but waves are calm. Accordingly, based on a comparison of the first and second biomass attribute parameter data sets 208a, 208b relative to the measured reference (e.g., environmental) data such as the reference parameter data set 208c, the processing system 210 assigns a first weighting factor $w_1$ of 0.9 to the first biomass estimation model (e.g., the first biomass estimation model 222a of FIG. 2) and its associated first model biomass estimate 312a and first normalized model biomass estimate 314a. Additionally, in this example where N=2 for using two different models in estimating biomass, the processing system 210 also assigns a second weighting factor $w_2$ of 0.1 to the second biomass estimation model (e.g., the second biomass estimation model 222b of FIG. 2) and its associated second model biomass estimate 312b and second normalized model biomass estimate 314b.

At a high level of abstraction, the processing system 210 determines that the acoustic data captured by the first sensor system 202a (which is positively influenced by, for example, calm waters) will have improved quality relative to acoustic data captured by the same first sensor system 202a under less favorable conditions (e.g., the first set of environmental conditions previously described). Additionally, the processing system 210 determines that the image data captured by the second sensor system 202b (which is negatively influenced by, for example, dark ambient light conditions and turbid waters) will have degraded quality (such as due to inaccuracies arising from visibility issues) relative to image data captured by the same second sensor system 202b under more favorable conditions (e.g., the first set of environmental conditions previously described).

Accordingly, the processing system 210 assigns a relative weighting with the first weighting factor $w_1$ of 0.9 for the first biomass estimation model (based on acoustic data) and the second weighting factor $w_2$ of 0.1 for the second biomass estimation model (based on image data) due to the second set of environmental conditions and discounts the image-based, second biomass estimation model that is expected to be less accurate in murky waters. Subsequently, the processing system 210 applies the assigned weighting factors $w_1$, $w_2$ to the first normalized model biomass estimate 314a and the second normalized model biomass estimate 314b, respectively, to generate a first weighted model biomass estimate 316a of 4.1 kgs and a second weighted model biomass estimate 316b of 0.5 kgs. Further, the processing system 210 combines these two weighted model biomass estimates 316a, 316b to generate a weighted, aggregated biomass estimate 318 of 4.6 kgs and thereby integrates data from multi-sensor systems (some sensors and estimation models being more accurate than others, sometimes in all instances or sometimes depending on variable factors such as the environment) measuring fish biomass attributes to provide a biomass estimate.

In various embodiments, the systems described herein may optionally generate a biomass triggered instruction signal 320 (as represented by the dotted line box) based at least in part on the aggregated biomass estimate 318 that instructs a user and/or one or more farm systems regarding specific actions to be taken in accordance to the biomass estimate (e.g., as quantified by the aggregated biomass estimate 318). For example, in some embodiments, the biomass triggered instruction signal 320 (as represented by the dotted line box) based at least in part on the aggregated biomass estimate 318 that instructs an automated feeding system regarding specific actions to be taken in accordance to the biomass estimate (e.g., change an amount of feed dispensed, change a formulation of feed dispensed, and the like).

Figure 4:
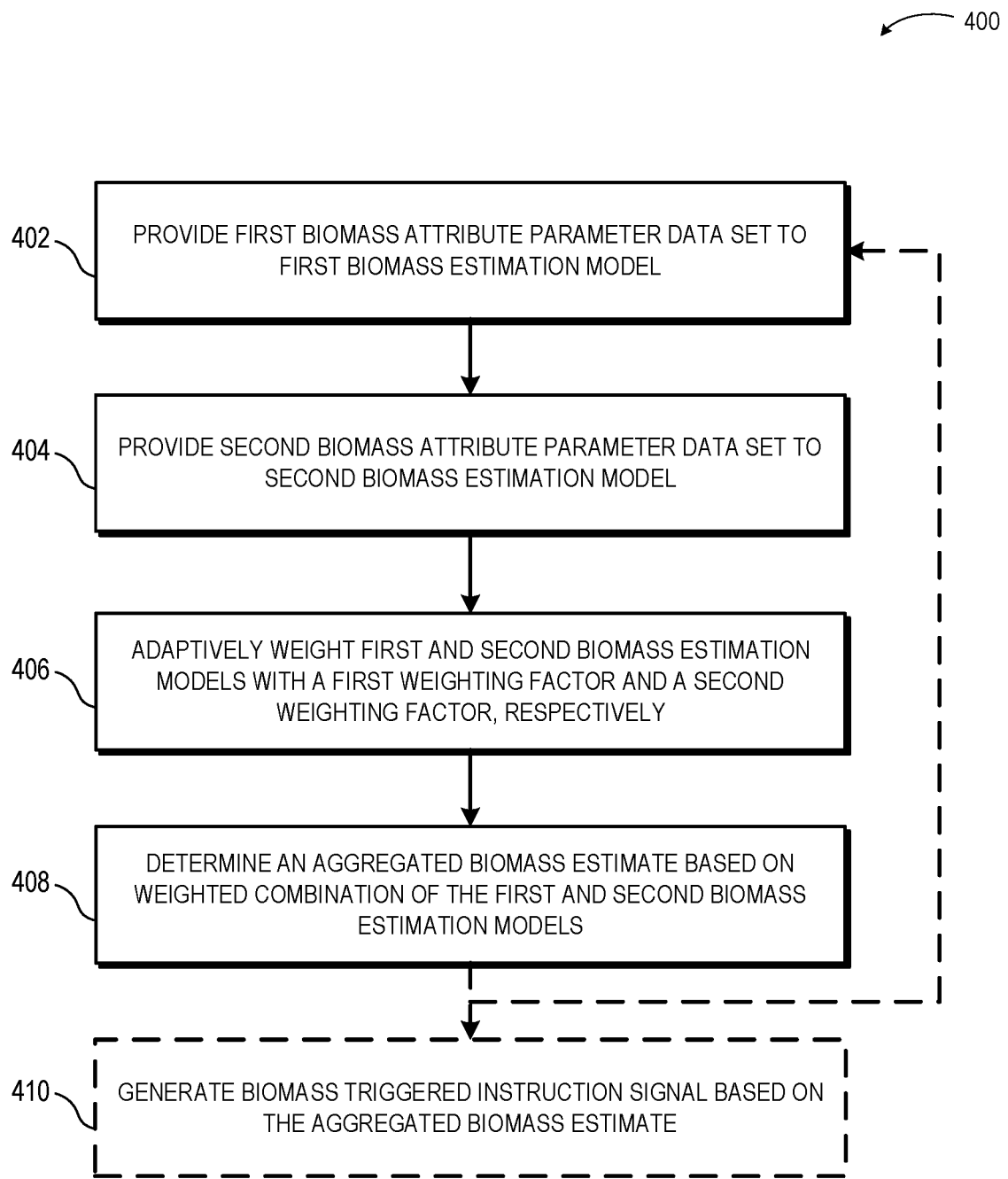
FIG. 4 is a flow diagram of a method for providing a biomass estimate in accordance with some embodiments.

Referring now to FIG. 4, illustrated is a flow diagram of a method 400 for providing a biomass estimate in accordance with some embodiments. For ease of illustration and description, the method 400 is described below with reference to and in an example context of the systems 100 and 200 of FIG. 1 and FIG. 2, respectively. However, the method 400 is not limited to this example context, but instead may be employed for any of a variety of possible system configurations using the guidelines provided herein.

The method 400 begins at block 402 with the receipt by a first biomass estimation model 222a of a first biomass attribute parameter data set 208a associated with a first biomass attribute parameter. In various embodiments, the operations of block 402 include providing, by a processing system, the first biomass attribute parameter data set 208a via a wireless or wired communications link to the first biomass estimation model 222a for processing. For example, in the context of FIGS. 1 and 2, the sensor systems 102, 202 communicate at least the first parameter data set 108a, 208a to a processing system 110, 210 for storage at a local storage device 116. As illustrated in FIG. 2, the first biomass estimation model 222a is executed locally using the same processing system 210 at which the first parameter data set 208a is stored. Accordingly, the first parameter data set 208a may be so provided to the first biomass estimation model 222a by transmitting one or more data structures to processors 112 via a wireless or wired link (e.g., communications bus 114) for processing. It should be noted that the first parameter data set and the first biomass estimation model do not need to be stored and/or processed at the same device or system. Accordingly, in various embodiments, the providing of the first parameter data set and its receipt by the first biomass estimation model for the operations of block 402 may be implemented in any distributed computing configuration (e.g., such as amongst the processing system 110, network 120, remote platforms 122, external resources 124, and server 126 of FIG. 1).

In at least one embodiment, the first parameter data set 108a, 208a includes data corresponding to measurements for at least a first biomass attribute parameter related to biomass estimation. For example, with reference to FIG. 2, the first biomass attribute parameter includes acoustic data corresponding to the presence (or absence), abundance, distribution, size, and behavior of underwater objects (e.g., a population of fish 212 as illustrated in FIG. 2). Such acoustic data measurements may therefore measure intensity of acoustic reflectivity of ensonified target(s) (e.g., fish) within the water to be used as an approximation of biomass. Although described here in the context of acoustic data characterizing physical properties of the population of fish 212, acoustic data related to physical properties of other underwater objects such as feed 214 may also be measured for the first parameter data set 208a.

Additionally, in various embodiments, acoustic data related to behavior of underwater objects may also be measured for the first parameter data set 208a. For example, in some embodiments, an acoustic sensor of the first sensor system 202a may monitor noises generated by the population of fish 212 during feeding (e.g., chomping noises resulting from jaw movement while the fish eat) as biomass attribute indicators. Similarly, in the context of swimming behavior, an acoustic sensor of the first sensor system 202 may monitor movement noises generated by the population of fish during feeding (e.g., noises resulting from swimming motion towards or away from feed pellets 214) such that an increase noise may be indicative of increased fish biomass and the sounds generated within the water as they swim and displace water.

The method 400 continues at block 404 with the receipt by a second biomass estimation model 222b (that is different from the first biomass estimation model) of a second biomass attribute parameter data set 208b associated with a second biomass attribute parameter. In various embodiments, the operations of block 404 include providing, by a processing system, the second biomass attribute parameter data set 208b via a wireless or wired communications link to the second biomass estimation model 222b for processing. For example, in the context of FIGS. 1 and 2, the sensor systems 102, 202 communicate at least the second parameter data set 108b, 208b to a processing system 110, 210 for storage at a local storage device 116. As illustrated in FIG. 2, the second biomass estimation model 222b is executed locally using the same processing system 210 at which the second parameter data set 208b is stored. Accordingly, the second parameter data set 208b may be so provided to the second biomass estimation model 222b by transmitting one or more data structures to processors 112 via a wireless or wired link (e.g., communications bus 114) for processing. It should be noted that the second parameter data set and the second biomass estimation model do not need to be stored and/or processed at the same device or system. Accordingly, in various embodiments, the providing of the second parameter data set and its receipt by the second biomass estimation model for the operations of block 404 may be implemented in any distributed computing configuration (e.g., such as amongst the processing system 110, network 120, remote platforms 122, external resources 124, and server 126 of FIG. 1).

In at least one embodiment, the second parameter data set 108b, 208b includes data corresponding to measurements for at least a second biomass attribute parameter related to biomass estimation. For example, with reference to FIG. 2, the second biomass attribute parameter includes image data corresponding to the presence (or absence), abundance, distribution, size, and behavior of underwater objects (e.g., a population of fish 212 as illustrated in FIG. 2). In various embodiments, such captured image data is processed to extract various measurements corresponding to biomass attributes (e.g., various image-related biomass attributes such as previously described with respect to FIG. 1). For example, such image data may be analyzed using various image analysis techniques to identify various physical properties associated with the population of fish 212 such as fish positions within the water, depth within the water, fish dimension measurements, individual identification of one or more animals, biomass location within the water, orientation of one or more fish relative to other sensors, and the like to be used as biomass attributes. Further, image data related to properties of other underwater objects may also be measured for the second parameter data set 208b.

It should be recognized that although biomass estimation was previously described with respect to FIGS. 1-4 in the context underwater acoustic sensors, underwater image sensors, and underwater environmental sensors, data may be collected by any of a variety of imaging and non-imaging sensors. By way of non-limiting examples, in various embodiments, the sensor systems may include various sensors local to the site at which the fish are located (e.g., underwater telemetry devices and sensors), sensors remote to the fish site (e.g., satellite-based weather sensors such as scanning radiometers), various environmental monitoring sensors, active sensors (e.g., active sonar), passive sensors (e.g., passive acoustic microphone arrays), echo sounders, photo-sensors, ambient light detectors, accelerometers for measuring wave properties, salinity sensors, thermal sensors, infrared sensors, chemical detectors, temperature gauges, or any other sensor configured to measure data that would have an influence on biomass estimation. It should be recognized that, in various embodiments, the sensor systems utilized herein are not limited to underwater sensors and may include combinations of a plurality of sensors at different locations, such as illustrated and described below with respect to FIG. 5. Additionally, it should also be recognized that, in various embodiments, the sensor systems utilized herein are not limited to sensors of differing types. For example, in various embodiments, the sensor systems may include two different image-data based sensor systems positioned at different locations (e.g., under water and above water as illustrated and described below with respect to FIG. 5) and/or a plurality of differing reference sensors.

The operations of method 400 continues at block 406 with adaptively weighting the first biomass estimation model with a first weighting factor relative to a second weighting factor for the second biomass estimation model. The operations of block 406 includes providing measured reference data related to the first biomass attribute parameter and the second biomass attribute parameter. In various embodiments, providing measured reference data includes the third sensor system 202c generating environmental data and providing the reference parameter data set 208c via a wireless or wired communications link to the processing system 210 for local storage and processing. It should be noted that the reference parameter data set 208c does not need to be stored at the same device or system at which the reference parameter data set 208c is processed to determine weighting factors. Accordingly, in various embodiments, the providing of the reference parameter data set 208c and its receipt by the processing system 210 for the operations of block 406 may be implemented in any distributed computing configuration (e.g., such as amongst the processing system 110, network 120, remote platforms 122, external resources 124, and server 126 of FIG. 1).

In at least one embodiment, the reference parameter data set 208c includes measured environmental reference data that is relevant to the precision/accuracy of individual biomass estimation models, the relative precision/accuracy between different biomass estimation models, relative availability or reliability of data captured by any of the sensor systems discussed herein, relative data granularity of data captured by any of the sensor systems discussed herein, and the like. Accordingly, in various embodiments, the processing system 210 assigns, based on a comparison of the biomass estimation models with the measured reference data, a first weight factor to the first biomass estimation model and a second weight factor to the second biomass estimation model.

With reference to FIGS. 2-3, the third sensor system 202c of FIG. 2 includes one or more environmental sensors configured to capture measurements associated with the environment 204 within which the system 200 is deployed and generate environmental data that serves as reference data for implementing the dynamic weighting of various biomass estimates from a plurality of biomass estimation models. In one embodiment, the environmental sensors of the third sensor system 202c includes a turbidity sensor configured to measure an amount of light scattered by suspended solids in the water.

With reference to the first set of environmental conditions in FIG. 3, as determined based at least in part on environmental data from the environmental sensors to identify conditions in which the weather is sunny plus waters are choppy but clean (e.g., based on the turbidity sensor measurements), the processing system 210 determines that the image data captured by the second sensor system 202b (which is positively influenced by, for example, ambient light due to the sunny conditions and clear waters) will be of a relatively better quality than the acoustic data captured by the first sensor system 202a (which is negatively influenced by, for example, background sounds due to the choppy waves which decrease the signal-to-noise ratio of acoustic data). For example, in some embodiments, the processing system 210 preferentially weights the image-based, second biomass estimation model over the acoustics-based, first biomass estimation model based on a clarity level of the water exceeding a predetermined threshold. Accordingly, the operations of block 406 include the processing system 210 assigning a relative weighting with the first weighting factor $w_1$ of 0.4 for the first biomass estimation model and the second weighting factor $w_2$ of 0.6 for the second biomass estimation model to account for differential biomass estimates in a multi-sensor system.

As will be appreciated, environmental conditions often vary and the relative accuracy of data gathered by different sensor systems will also vary over time. With reference to the second set of environmental conditions in FIG. 3, as determined based at least in part on environmental data from the environmental sensors to identify conditions for a second, future period of time in which the weather is expected to be dark (e.g., at dusk or dawn), waters have increased turbidity levels, but waves are calm, the processing system 210 determines that the image-based, second biomass estimation model is expected to be less accurate in murky waters along with low ambient light levels. Thus, the processing system 210 will adaptively re-weight the weightings assigned to different biomass estimation models (relative to the weightings assigned with respect to the first set of environmental conditions). Accordingly, the operations of block 406 include the processing system 210 assigning a relative weighting with the first weighting factor $w_1$ of 0.9 for the first biomass estimation model (based on acoustic data) and the second weighting factor $w_2$ of 0.1 for the second biomass estimation model (based on image data) to discount the image-based, second biomass estimation model that is expected to be less accurate in dark and murky waters.

It should be recognized that although the weighting of different biomass estimation models is described in the specific context of variable turbidity level measurements and biomass estimates, the operations of block 406 may involve weighting considerations including any number of and any combination of parametric considerations (including data sets collected from a plurality of different environmental sensors including photodetectors to detect ambient light conditions and accelerometers to measure wave heights/swell periods, as referenced above but not explicitly discussed) without departing from the scope of this disclosure. For example, such parametric environmental considerations may include data sets related to one or more water environment parameters, meteorological parameters, forecasts of the same for future time periods, and the like.

Further, it will be appreciated that various non-environmental considerations also have relevance as to the precision/accuracy of individual biomass estimation models, the relative precision/accuracy between different biomass estimation models, relative availability or reliability of data captured by any of the sensor systems discussed herein, and the like. In various embodiments, sensor measurements corresponding to different data sets (e.g., first and second parameter data sets 108a, 108b) may be captured with differing temporal granularities. For example, in one hypothetical situation and with reference back to system 200, the image-based second set of sensors may be configured to decrease a frame rate of image capture in response to low-bandwidth issues. However, the acoustics-based first set of sensors may not be subject to such performance throttling as audio files generally occupy less storage space and consume less bandwidth for transfer. In such a hypothetical situation, a rate of sensor data capture serves as the reference parameter to be the basis for relative weighting of different biomass attribute parameters instead of measured environmental data, whereby the processing system 210 preferentially underweights a biomass estimation model based on its access to a lower quantity of data until low-bandwidth conditions are resolved. Similarly, in another hypothetical situation, the image-based second set of sensors may be configured to downsample captured images prior to transmission to the processing system 210 in response to low-bandwidth issues. In such a hypothetical situation, a qualitative measure of data (such as relative to an expected baseline) serves as the reference parameter to be the basis for relative weighting of different biomass attribute parameters instead of measured environmental data, whereby the processing system 210 preferentially underweights a biomass estimation model based on its access to a lower quality of data until low-bandwidth conditions are resolved.

Sensor measurements corresponding to different data sets (e.g., first and second parameter data sets 108a, 108b) may be captured with differing spatial granularities. With reference back to system 200, an image-based second set of sensors may be configured such that a single camera is oriented to capture underwater imagery at a farming site containing multiple sea cages (not shown) that each hold a different population of fish 212 in one embodiment. In another embodiment, an image-based second set of sensors may be configured such that a camera is allocated for each of the multiple sea cages. In yet another embodiment, an image-based second set of sensors may be configured such that multiple cameras are allocated for each of the multiple sea cages (e.g., each of the multiple cameras monitoring a different portion within the volume of the sea cage). As will be appreciated, each of these different embodiments captures image data at a different spatial granularity with respect to the amount of area encompassing each camera's field of view. Across such embodiments, a resolution of data capture as it relates to spatial granularity serves as the reference parameter to be the basis for weighting of biomass attribute parameters. For example, the processing system 210 may preferentially overweight a biomass estimation model based on its access to multiple camera streams covering multiple points of view.

It will also be appreciated that the granularity concept is applicable not only to relative weightings between different biomass estimation models but also to weightings as to which reference parameters should be more or less influential in the determination of model weightings. For example, with respect to spatial granularity, consider a first hypothetical having a first set of environmental conditions such as previously described with reference to FIG. 3 in which the weather is sunny, waters are clean, and waves are choppy. In this first hypothetical, the environmental conditions are determined based on environmental sensors (e.g., using the third sensor system 202c) that measure and generate environmental data locally at a location proximate to the population of fish 212 and the processing system 210 generates the relative weightings of FIG. 3.

Now consider a second hypothetical having a second set of environmental conditions similar to the first set in which the weather is sunny, waters are clean, and waves are choppy. However, in this second hypothetical, reference data corresponding to the sunny weather conditions is measured and generated at a weather sensing station that is remotely located away from the location of the population of fish 212. For example, in some embodiments, the weather data includes remote sensing data from satellite imagery and data, for example with a resolution of approximately 1000 square miles. In other embodiments, the weather data includes remote sensing upper air (e.g., as captured via radiosondes and the like) data with a resolution of approximately 100 square miles. In other embodiments, the weather data includes surface coastal station data with higher accuracy but a resolution of approximately 10 square miles. Further, in various embodiments, the weather data includes measurements from, for example, in-situ sensors including buoys, gliders, flying drones, and the like with varying degrees of accuracy and resolution. As will be appreciated, the varying spatial granularity at which these weather sensors capture data will affect the underlying biomass estimation models and the relative weights assigned to different biomass estimations. Accordingly, in this second hypothetical, the processing system 210 will give less weight to the sunny weather conditions (relative to its importance with respect to the first hypothetical discussed above) due to the lesser spatial granularity of sunny weather being determined by a remote weather sensor. For example, the processing system 210 may assign a second weighting factor $w_2$ of less than 0.6 to the image-based, second biomass estimation model to account for an increase in uncertainty as to whether the sunny conditions measured by the remote sensor are indeed applicable to the local micro-climate at which the population of fish 212 are location.

Additionally, it will be appreciated that the various non-environmental considerations discussed herein are not limited to differing granularities at which data is collected and/or analyzed (e.g., temporal, spatial, qualitative, quantitative, or any other categorization in which data may be assigned relative coarse-to-fine assignations). In some embodiments, the reference data includes an actual amount of feed given for a prior time period. That is, rather than the reference parameter data set 208c corresponding to measured environmental data, the reference parameter data set 208c includes data corresponding to how much feed the population of fish 212 actually ate within each of one or more time intervals (e.g., days, hours, minutes, or any other block of time) for which an amount of administered feed is measured. The one or more time intervals for which model weighting is applied are approximately equal in length to each other, but the length may vary and may be selected based on various factors including availability of data, desired degree of accuracy, and the like.

In various embodiments, assigning of the relative weight factors between a first weight factor and a second weight factor (e.g., first and second weighting factors $w_1$, $w_2$ of FIG. 3) includes assigning the first weight factor based on a comparison of a first predicted feed amount provided by the first biomass estimation model relative to the actual amount of feed given for the prior time period. Further, assigning of the relative weight factors includes assigning the second weight factor based on a comparison of a second predicted feed amount provided by the second biomass estimation model relative to the actual amount of feed given for the prior time period. For example, in one embodiment, the actual amount of feed given for the prior time period (e.g., prior full day of feeding) corresponds to data regarding an amount of feed given to a population of fish by an experienced feeder. In this manner, the processing system compares a predicted amount of feed associated with the first biomass estimation model from the prior day and also a predicted amount of feed associated with the second biomass estimation model from the prior day relative to the actual amount of feed given. Using this comparison, the processing system may assign relative weightings to the two or more different biomass estimation models based at least in part on their respective capabilities to predict the amounts of feed given and conversion of feed into animal biomass. That is, in various embodiments, an amount of feed dispensed, consumed, or other feed-related data is utilized as a biomass indicator (such as by determining biomass growth based on expected or calculated feed conversion rates).

Additionally, those skilled in the art will recognize that the reference parameter data set 208c is not limited to data from a separate data source (e.g., a different third sensor system 202c that captures environmental data to serve as reference data). For example, in various embodiments, the biomass attribute data itself and/or data relationships between the first biomass attribute parameter data set 208a and a second biomass attribute parameter data set 208b are derived to generate reference data. In various embodiments, assigning of the relative weight factors between a first weight factor and a second weight factor (e.g., first and second weighting factors $w_1$, $w_2$ of FIG. 3) includes assigning the first weight factor based on a determination of a fish's orientation in three dimensional space relative to the acoustic sensor system 202a (e.g., based on fish pose information determined from image data) at approximately the same moment of acoustic data capture.

Various parameters influence the accuracy of not only initial data capture/measurement but also subsequent calculations based on that data such that small initial errors can propagate into larger downstream processing errors. In the context of measuring an individual fish, relevant data capture parameters include but is not limited to one or more of an elevation angle of a fish relative to the sensor system, a flatness level of the fish relative to the sensor system, a pose or perpendicularity of the fish relative to the sensor system, a distance of the fish relative to the sensor system, and the like. As will be appreciated, the target strength of an acoustic target (e.g., a fish) is influenced by, amongst other parameters, a tilt angle and volume of its swim bladder relative to an echo-sounder. Accordingly, in some embodiments, the adaptive weighting operations of block 406 includes identifying fish tilt orientation in three-dimensional space relative to the sensor system(s) (e.g., three dimensional pose to acoustic and/or the image data sensor) and preferentially weighting biomass estimation models for which the pose of the target fish is conducive for increased biomass estimation accuracy.

In various embodiments, the processing systems described herein use one or more learned models (not shown) to determine the relative weightings that should be assigned to various biomass estimation models and/or to reference parameters against which influence the various biomass estimation models. Further, additional inputs provided, or the results of feeding according to the estimated biomass, or both, then are incorporated into the learned model so that the learned model evolves to facilitate the subsequent performance of similar biomass estimation. In various embodiments, the learned model includes a system represented by one or more data structures, executable instructions, or combinations thereof, that is trained based having an internal representation modified or adapted based in input or experience during the training process. One example of the learned model is a neural network. Other implementations include parametric representations, such as coefficients for dynamics models, latent or explicit embedding into metric spaces for methods like nearest neighbors, or the like.

In some embodiments, the learned model is initialized through a supervised learning process (e.g., a "learning by demonstration" process) so as to obtain a baseline set of knowledge regarding the operational environment 104, 204 and the performance of at least certain biomass estimations by the systems 100, 200. In other embodiments, the learned model may be initiated at a particular processing system (e.g., processing systems 110 and 210) by, for example, populating the learned model with the knowledge of a learned model of other similar biomass estimation models optimized for different locales, or a "default knowledge core" maintained by the processing systems 110, 210 for distribution to each biomass estimation as additional sensor systems 102 and/or parameter data sets 108 are integrated into the systems 100, 200 or otherwise become available to storage and processing.

With the relative weightings assigned to their respective biomass estimation models, at block 408 the processing system determines an aggregated biomass estimate based on a weighted combination of the biomass estimates from a plurality of biomass estimation models. In this context, the "weighted combination" and "aggregated biomass estimate" can be specified in various ways, depending on the goals and parametric outputs specified by the systems 100, 200. For example, in one embodiment and with reference to FIG. 3, determining the aggregated biomass estimate includes normalizing a first model biomass estimate 302a of 4.5 kgs (e.g., based on a metric unit of mass with a single decimal place after the decimal point) and a second model biomass estimate 302b of 11.03 lbs (e.g., based on an imperial unit of mass with two decimal places after the decimal point) to a common unit scale to generate a normalized biomass estimate for the first and second model biomass estimates 302a, 302b. In particular, the processing system 210 normalizes the model biomass estimates based on a metric unit of mass with a single decimal place after the decimal point to generate a first normalized model biomass estimate 304a of 4.5 kgs associated with the first model biomass estimate 302a and a second normalized model biomass estimate 304b of 5.0 kgs associated with the second model biomass estimate 302b. Subsequently, the processing system 210 applies the assigned weighting factors $w_1=0.4$ and $w_2=0.6$ to the first normalized model biomass estimate 304a and the second normalized model biomass estimate 304b, respectively, to generate a first weighted model biomass estimate 306a of 1.8 kgs and a second weighted model biomass estimate 306b of 3.0 kgs. Further, the processing system 210 combines these two weighted model biomass estimates 306a, 306b to generate a weighted, aggregated biomass estimate 308 of 4.8 kgs and thereby integrates data from multi-sensor systems to provide an aggregated biomass estimate.

Those skilled in the art will recognize that the example aggregated biomass estimate of FIG. 3 based on a scale having a metric unit of mass with a single decimal place after the decimal point is provided only for illustrative purposes to give a concrete example of the weighting and biomass estimate aggregation operations discussed herein. However, any of a variety of unit scales and/or user interface schemes may be implemented for representing the aggregated biomass estimate. For example, in any of the exemplary systems disclosed here, color coding may be used to indicate categories of any parameter. For example, in the display of a user interface, color coding may be used to indicate whether a population of fish is predicted to be underweight (e.g., with the color red), at target weight (e.g., with the color yellow), or gaining weight better than expected (e.g., with the color green). Similarly, color coding may be used to indicate whether a feeder should, based on the aggregated biomass estimate, stop feeding (e.g., with the color red), begin monitoring for signs of satiation (e.g., with the color yellow), or begin/continue feeding (e.g., with the color green).

Returning now to numerical representations of the aggregated biomass estimate, those skilled in the art will recognize that the aggregated biomass estimate is not limited to providing a metric associated with biomass levels but may instead (or additionally) prescribe specific actions to be taken. For example, in some embodiments, the processing system 110, 210 uses the aggregated biomass estimate to determine a predicted amount of feed to administer for a particular time period (e.g., a feeding recommendation). Such an output may be provided to, for example, automated feeding systems to eliminate or reduce human intervention as it associates to feeding activities. In other embodiments, the processing system 110, 210 uses the aggregated biomass estimate to determine when a sufficient population (e.g., percentage of population) have reached a threshold size (e.g., average biomass exceeding 4 kilograms per individual fish and therefore ready to be harvested) and coordinates logistics for harvesting operations.

Further, the unit interval within a scale is not limited to being linear and in various embodiments, the unit interval is transformed to have any desired distribution within a scale (e.g., a scale including 100 points from 0 to 100), for example, arctangent, sigmoid, sinusoidal, and the like. In certain distributions, the intensity values increase at a linear rate along the scale, and in others, at the highest ranges the intensity values increase at more than a linear rate to indicate that it is more difficult to climb in the scale toward the extreme end of the scale. In some embodiments, the raw intensity biomass estimates are scaled by fitting a curve to a selected group of canonical exercise routines that are pre-defined to have particular intensity biomass estimates.

Thus, the operations of method 400 provides variable and relative weighting to different biomass estimates from different biomass estimation models and combines them into an aggregated biomass estimate that is more accurate than would be individually provided by each biomass estimation model by itself. It should be noted that the method 400 is illustrated as a single instance of relative weighting between two biomass estimation models based on a single reference parameter for ease of illustration and description. However, in some embodiments, after a single pass through the operations of blocks 402-408 is completed for determining a biomass estimate for a first time period, the operations of blocks 402-408 may be repeated for additional passes to determine a biomass estimate for a second time period (e.g., such as to provide continually updating biomass estimates) or a different time period interval (e.g., such as to provide more or less granular biomass estimates). In some embodiments, after a single pass through the operations of blocks 402-408 is completed for determining a biomass estimate, the operations of blocks 402-408 may be repeated for re-weighting as environmental conditions change, refining of relative weightings to adjust for additional factors (e.g., consideration of more than one reference parameter data set), and the like.

Additionally, in various embodiments, at block 410 the processing system optionally generates (as represented by the dotted line box) a biomass triggered instruction signal based at least in part on the aggregated biomass estimate that instructs a user and/or one or more farm systems regarding specific actions to be taken in accordance to the biomass estimate (e.g., as quantified by the aggregated biomass estimate). For example, with respect to FIG. 3 as previously discussed, the biomass triggered instruction signal 310 (as represented by the dotted line box) based at least in part on the aggregated biomass estimate 308 instructs an automated feeding system regarding specific actions to be taken in accordance to the biomass estimate (e.g., change an amount of feed dispensed, change a formulation of feed dispensed, and the like).

Figure 5:
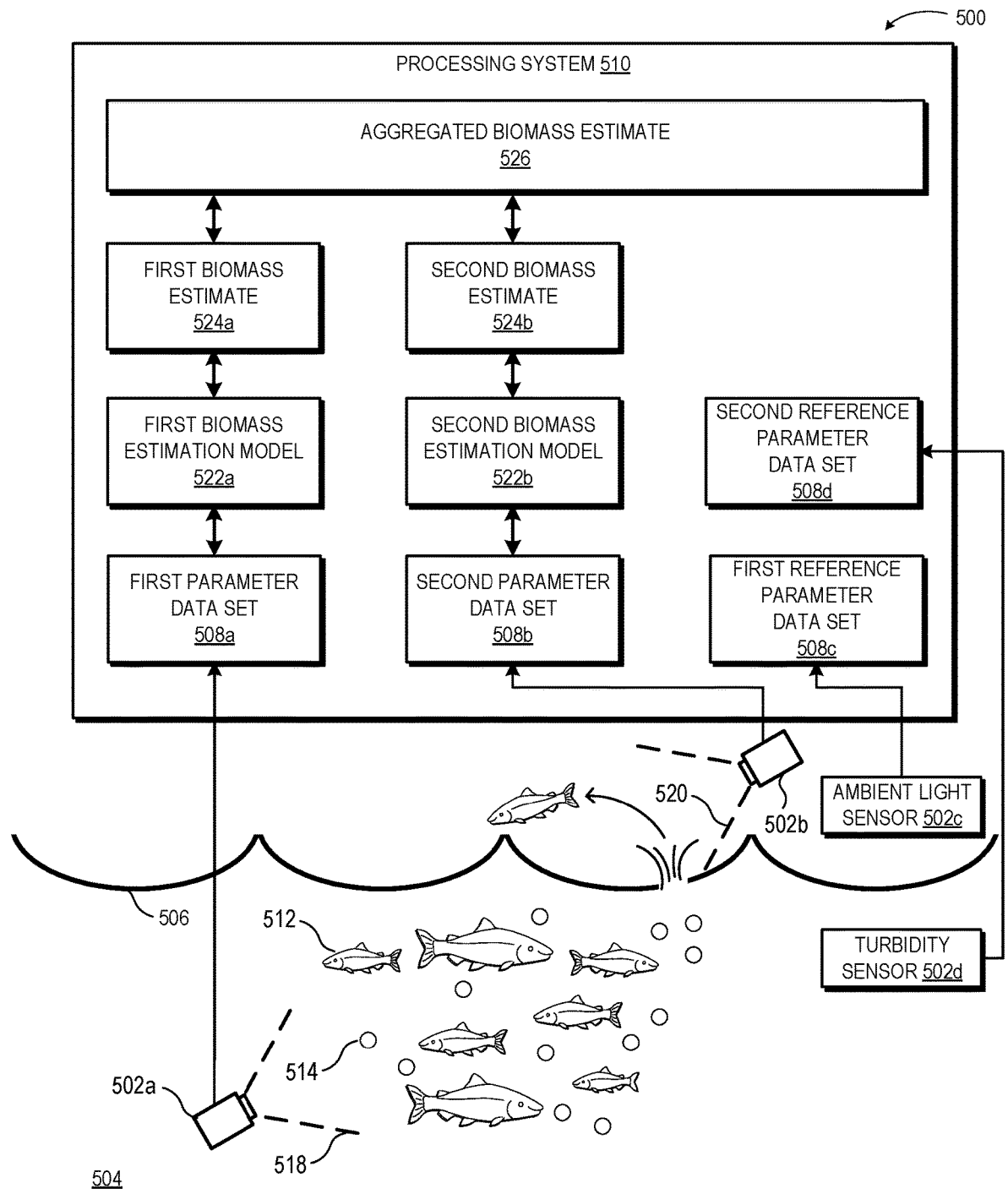
FIG. 5 is a diagram illustrating a biomass estimation system implementing two sets of image-based sensors in accordance with some embodiments.

It should be recognized that although biomass estimation and aggregated biomass estimation has been primarily discussed here in the context of sensors capturing different data types and within similar locations (e.g., underwater sensors of FIG. 2), any combination of sensors including multiple sensors capturing similar data and multi-location sensors may be employed for any of a variety of possible configurations without departing from the scope of this disclosure. For example, and now referring to FIG. 5, illustrated is a diagram showing a system 500 implementing two sets of image-based sensors in accordance with some embodiments. In various embodiments, the system 500 includes a plurality of sensor systems 502 that are each configured to monitor and generate data associated with the environment 504 within which they are placed.

As shown, the plurality of sensor systems 502 includes a first sensor system 502a positioned below the water surface 506 and including a first set of one or more sensors. The first set of one or more sensors are configured to monitor the environment 504 below the water surface 506 and to observe fish behavior and capture measurements associated with biomass attribute parameters related to fish biomass. It will be appreciated that biomass attribute parameters, in various embodiments, include one or more parameters corresponding to the environment 504 within which the one or more sensors are positioned and may be measured (or otherwise captured and detected) to generate parameter data sets 508 to be used in biomass estimation models.

In various embodiments, the first sensor system 502a of FIG. 5 includes one or more imaging sensors configured to observe fish behavior and capture measurements associated with biomass attribute parameters related to fish biomass. In various embodiments, the imaging sensors are configured to capture image data corresponding to, for example, the presence (or absence), abundance, distribution, size, and behavior of underwater objects (e.g., a population of fish 512 as illustrated in FIG. 5). In various embodiments, such captured image data is processed to extract various measurements corresponding to biomass attributes (e.g., various image-related biomass attributes such as previously described with respect to FIG. 1). It should be recognized that although specific sensors are described below for illustrative purposes, various imaging and non-imaging sensors may be implemented in the systems described herein without departing from the scope of this disclosure.

In some embodiments, the imaging sensors of the first sensor system 502a includes one or more cameras configured to capture still images and/or record moving images (e.g., video data). The one or more cameras are directed towards the surrounding environment 504 below the water surface 506, with each camera capturing a sequence of images (e.g., video frames) of the environment 504 and any objects in the environment. In various embodiments, each camera has a different viewpoint or pose (i.e., location and orientation) with respect to the environment. Although FIG. 5 only shows a single camera for ease of illustration and description, persons of ordinary skill in the art having benefit of the present disclosure should appreciate that the first sensor system 502a can include any number of cameras and which may account for parameters such as each camera's horizontal field of view, vertical field of view, and the like. Further, persons of ordinary skill in the art having benefit of the present disclosure should appreciate that the first sensor system 502b can include any arrangement of cameras (e.g., cameras positioned on different planes relative to each other, single-plane arrangements, spherical configurations, and the like).

In various embodiments, the imaging sensors of the first sensor system 502a includes a first camera (or lens) having a particular field of view 518 as represented by the dashed lines that define the outer edges of the camera's field of view that images the environment 504 or at least a portion thereof. For the sake of clarity, only the field of view 518 for a single camera is illustrated in FIG. 5. In various embodiments, the imaging sensors of the first sensor system 502a includes at least a second camera having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 518 of the first camera of the first sensor system 502a may, in some embodiments, overlap with the fields of view of two other cameras to form an overlapping field of view with three different perspectives of the environment 504.

In some embodiments, the imaging sensors of the first sensor system 502a includes one or more light field cameras configured to capture light field data emanating from the surrounding environment 504. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the first sensor system 502a includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras for ease of description and illustration. However, it should be recognized that the operations described herein may similarly be implemented with any type of imaging sensor without departing from the scope of this disclosure. For example, in various embodiments, the imaging sensors of the first sensor system 502a may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyperspectral cameras, thermal cameras, and the like.

Additionally, as illustrated in FIG. 5, the plurality of sensor systems 502 includes a second sensor system 502b positioned above the water surface 506 and including a second set of one or more sensors. The second set of one or more sensors are configured to monitor the environment 504 proximate to (e.g., at the water surface or even slightly underwater if the one or more sensors are capable of imaging) and above the water surface 506 and generate data associated with a second biomass attribute parameter. In particular, the second sensor system 502b of FIG. 5 includes one or more imaging sensors configured to observe fish behavior and capture measurements associated with biomass attribute parameters related to fish biomass. In various embodiments, the imaging sensors are configured to capture image data corresponding to, for example, the presence (or absence), abundance, distribution, size, and behavior of objects (e.g., a population of fish 512 as illustrated in FIG. 5). In various embodiments, such captured image data is processed to extract various measurements corresponding to biomass attributes (e.g., various image-related biomass attributes such as previously described with respect to FIG. 1). It should be recognized that although specific sensors are described below for illustrative purposes, various imaging and non-imaging sensors may be implemented in the systems described herein without departing from the scope of this disclosure.

In some embodiments, the imaging sensors of the second sensor system 502b includes one or more cameras configured to capture still images and/or record moving images (e.g., video data). The one or more cameras are directed towards the environment proximate the water surface 506, with each camera capturing a sequence of images (e.g., video frames) of the environment 504 and any objects in the environment. In various embodiments, each camera has a different viewpoint or pose (i.e., location and orientation) with respect to the environment. Although FIG. 5 only shows a single camera for ease of illustration and description, persons of ordinary skill in the art having benefit of the present disclosure should appreciate that the second sensor system 502b can include any number of cameras and which may account for parameters such as each camera's horizontal field of view, vertical field of view, and the like. Further, persons of ordinary skill in the art having benefit of the present disclosure should appreciate that the second sensor system 502b can include any arrangement of cameras (e.g., cameras positioned on different planes relative to each other, single-plane arrangements, spherical configurations, and the like).

In various embodiments, the imaging sensors of the second sensor system 502b includes a first camera (or lens) having a particular field of view 520 as represented by the dashed lines that define the outer edges of the camera's field of view that images the environment 504 or at least a portion thereof. For the sake of clarity, only the field of view 520 for a single camera is illustrated in FIG. 5. In various embodiments, the imaging sensors of the second sensor system 502b includes at least a second camera (or lens) having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 520 of the first camera of the second sensor system 502b may, in some embodiments, overlap with the fields of view of two other cameras to form an overlapping field of view with three different perspectives of the environment 504.

In some embodiments, the imaging sensors of the second sensor system 502b includes one or more light field cameras configured to capture light field data emanating from the surrounding environment 504. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the second sensor system 502b includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras for ease of description and illustration. However, it should be recognized that the operations described herein may similarly be implemented with any type of imaging sensor without departing from the scope of this disclosure. For example, in various embodiments, the imaging sensors of the second sensor system 502b may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyper-spectral cameras, thermal cameras, and the like.

Additionally, as illustrated in FIG. 5, the plurality of sensor systems 502 includes a third sensor system 502c including a third set of one or more sensors. As described in further detail herein, in various embodiments, the environmental sensors of the third sensor system 502c generate environmental data that serves as reference data for implementing the dynamic weighting of various biomass estimates from a plurality of biomass estimation models. For example, in one embodiment, the environmental sensors of the third sensor system 502c includes an ambient light sensor or other photodetector configured to sense or otherwise measure an amount of ambient light present within the environment local to the sensor. It should be recognized that although FIG. 5 is described in the specific context of an ambient light sensor, the third sensor system 502c may include any number of and any combination of various environmental sensors without departing from the scope of this disclosure.

Further, the plurality of sensor systems 502 includes a fourth sensor system 502d including a fourth set of one or more sensors. The fourth set of one or more sensors are configured to monitor the environment 504 below the water surface 506 and generate data associated with a reference parameter. As described in further detail herein, in various embodiments, the environmental sensors of the fourth sensor system 502d generate environmental data that serves as reference data for implementing the dynamic weighting of various biomass estimates from a plurality of biomass estimation models. For example, in one embodiment, the environmental sensors of the fourth sensor system 502d includes a turbidity sensor configured to measure an amount of light scattered by suspended solids in the water. In general, the more total suspended particulates or solids in water, the higher the turbidity and therefore murkier the water appears. It should be recognized that although FIG. 5 is described in the specific context of a turbidity sensor, the fourth sensor system 502d may include any number of and any combination of various environmental sensors without departing from the scope of this disclosure.

The first sensor system 502a and the second sensor system 502b each generate a first biomass attribute parameter data set 508a and a second biomass attribute parameter data set 508b, respectively. In the context of FIG. 5, the first biomass attribute parameter includes image data captured from below the water surface 506 and the second biomass attribute parameter includes image data captured with respect to the water surface 506 or from above the water surface 506. Such image data may include any image-related value or other measurable factor/characteristic that is representative of at least a portion of a data set that describes the presence (or absence), abundance, distribution, size, and/or behavior of objects (e.g., a population of fish 512 as illustrated in FIG. 5).

For example, in various embodiments, the image data of the first and second biomass attribute parameter data sets 508a, 508b includes camera images capturing measurements representative of the relative and/or absolute locations of individual fish of the population of fish 512 within the environment 504. The image data may also include camera images capturing measurements representative of the behavior of individual fish of the population of fish 512. For example, the image data may include camera images capturing data related to one or more biomass attributes of individual fish of the population of fish 512 within the environment 504. It should be recognized that although the first biomass attribute parameter and the second biomass attribute parameter has been abstracted and described here generally as "image data" for ease of description, those skilled in the art will understand that image data (and therefore the first biomass attribute parameter data set 508a and the second biomass attribute parameter data set 508b corresponding to the image data) may include, but is not limited to, any of a plurality of image frames, extrinsic parameters defining the location and orientation of the image sensors, intrinsic parameters that allow a mapping between camera coordinates and pixel coordinates in an image frame, camera models, operational parameters of the image sensors (e.g., shutter speed), depth maps, and the like.

Similarly, in the context of FIG. 5, the reference parameter includes environmental data. Such environmental data may include any measurement representative of the environment 504 within which the environmental sensors are deployed. For example, the environmental data (and therefore the first reference parameter data set 508c and the second reference parameter data set 508d corresponding to the environmental data) may include, but is not limited to, any of a plurality of ambient light measurements, water turbidity measurements, water temperature measurements, metocean measurements, satellite weather measurements, weather forecasts, air temperature, dissolved oxygen, current direction, current speeds, and the like.

In various embodiments, the processing system 510 receives one or more of the data sets 508 (e.g., first biomass attribute parameter data set 508a, the second biomass attribute parameter data set 508b, the first reference parameter data set 508c, and the second reference parameter data set 508d) via, for example, wired-telemetry, wireless-telemetry, or any other communications links for processing. The processing system 510 provides the first biomass attribute parameter data set 508a to a first biomass estimation model 522a. The processing system 510 also provides the second biomass attribute parameter data set 508b to a second biomass estimation model 522b different from the first biomass estimation model 522a. In various embodiments, the first biomass estimation model 522a receives the image data of the first biomass attribute parameter data set 508a as input and generates a first biomass estimate 524a. By way of non-limiting example, in some embodiments, the first biomass estimation model 522a utilizes image data related to containing measurements related to one or more biomass attributes of individual fish (or with respect to two or more fish) for generating the first biomass estimate 524a. In various embodiments, the first biomass estimate 524a is a numerical description of a body weight of an individual fish. In some embodiments, the first biomass estimate 524a is a numerical description of an average body weight for fish within the population of fish 512.

The processing system 510 also provides the second biomass attribute parameter data set 508b to a second biomass estimation model 522b. In various embodiments, the second biomass estimation model 522b receives the image data of the second biomass attribute parameter data set 508b as input and generates a second biomass estimation 524b. By way of non-limiting example, in some embodiments, the second biomass estimation model 522b utilizes image data containing measurements related to one or more biomass attributes of individual fish (or with respect to two or more fish) for generating the second biomass estimate 524b. In various embodiments, the second biomass estimate 524b is a numerical description of a body weight of an individual fish. In some embodiments, the second biomass estimate 524b is a numerical description of an average body weight for fish within the population of fish 512. In some examples, for example, the image data captured by the second set of sensors 502b may be analyzed to quantify or otherwise determine a level of surface level activity exhibited by the fish 512 (e.g., resulting from fish jumping out of the water as illustrated, rolling along the water surface 506, splashes at the water surface 506c caused by jumping, and the like) as a biomass attribute for generating the second biomass estimate 224b (e.g., an amount of total activity being correlated with total biomass within a marine enclosure housing the fish 512).

Subsequently, such as previously discussed in more detail with reference to FIGS. 3 and 4, the processing system 510 adaptively weights the first biomass estimate 524a of the first biomass estimation model 522a with a first weighting factor relative to a second weighting factor for a second biomass estimate 524b of the second biomass estimation model 522b in order to determine an aggregated biomass estimate 526 based on a combination of the first biomass estimation model 522a using the first weight factor and the second biomass estimation model 522b using the second weight factor. For example, in one embodiment, the processing system 510 may preferentially weight the second biomass estimation model 522b (i.e., model based on surface camera images) relative to the first biomass estimation model 522a (i.e., model based on sub-surface camera images) when environmental conditions are indicated by the reference sensors 502c, 502d to include turbid waters but sunny weather at noon. Similarly, the processing system 510 may preferentially underweight the second biomass estimation model 522b (i.e., model based on surface camera images) relative to the first biomass estimation model 522a (i.e., model based on sub-surface camera images) when environmental conditions are indicated by the reference sensors 502c, 502d to include clear waters but foggy weather conditions such that the surface cameras of the second sensor system 502b will be less reliable.

It should be recognized that although biomass estimation and aggregated biomass estimation has been primarily discussed in the context of sensors capturing data for aquaculture biomass estimation, the concepts described herein may similarly be employed for any of a variety of farming environments without departing from the scope of this disclosure. For example, and now referring to FIG. 6, illustrated is a diagram showing a terrestrial biomass estimation system 600 implementing different sensors for livestock biomass estimation in accordance with some embodiments.

In various embodiments, the system 600 includes a plurality of sensor systems 602 that are each configured to monitor and generate data associated with the environment 604 within which they are placed. As shown, the plurality of sensor systems 602 includes a first sensor system 602a including a first set of one or more sensors. The first set of one or more sensors are configured to monitor the environment 604 within which they are placed and generate data associated with a first biomass attribute parameter. Additionally, the plurality of sensor systems 602 includes a second sensor system 602b including a second set of one or more sensors. The second set of one or more sensors are configured to monitor the environment 604 within which they are placed and generate data associated with a second biomass attribute parameter.

Figure 6:
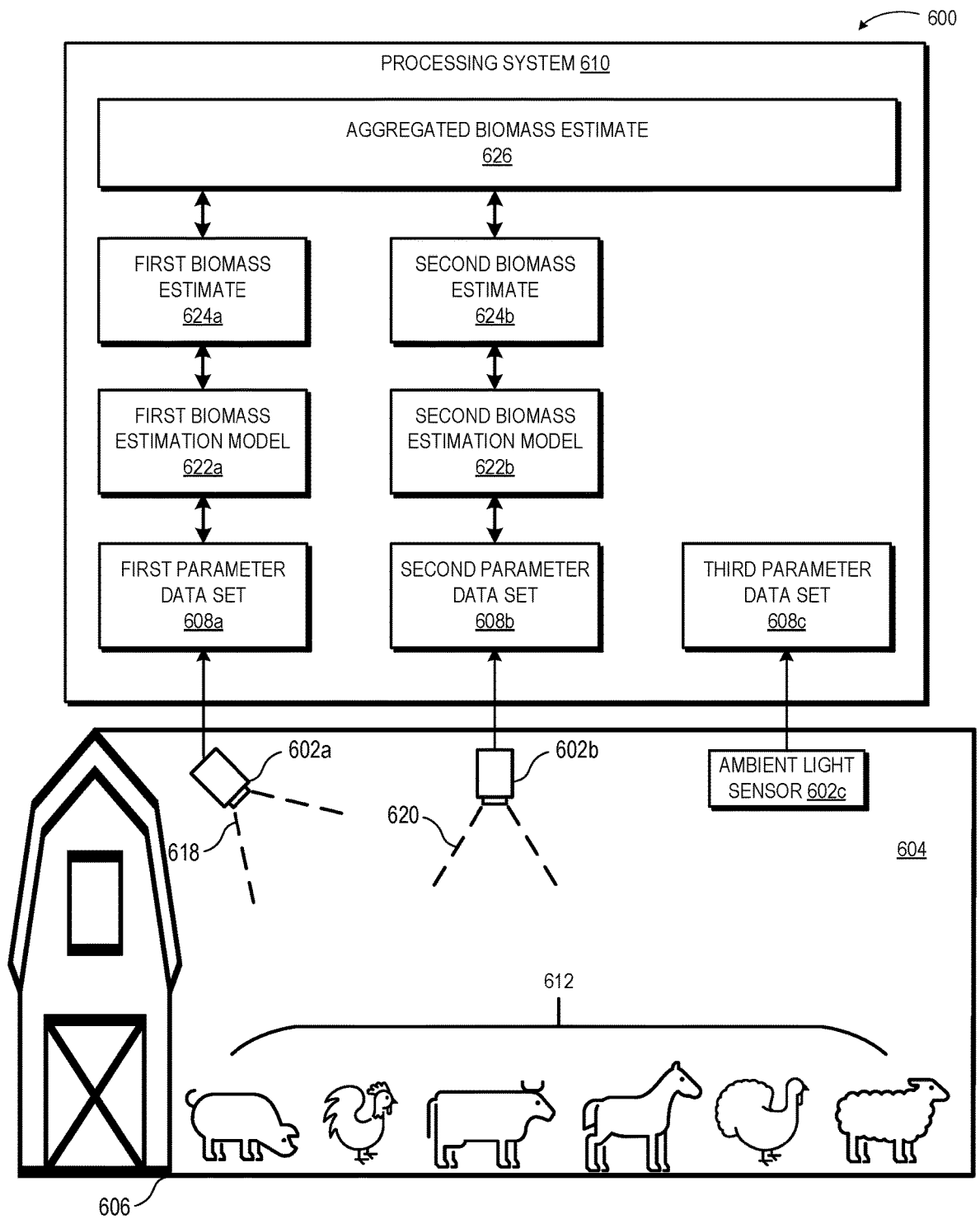
FIG. 6 is a diagram illustrating a terrestrial biomass estimation system implementing various sensor systems in accordance with some embodiments.

In particular, the first sensor system 602a of FIG. 6 includes one or more imaging sensors configured to observe animal behavior and capture measurements associated with biomass attribute parameters related to animal biomass. As used herein, the term "animal" generally includes any livestock that is raised including fish, poultry, pigs, horses, birds, insects, and the like. Animals include aquaculture animals such as fish (such as previously described with respect to FIGS. 1-5) and shrimp, beef cattle, poultry, swine, and any other farm animal raised for profit and/or meat production. Further, animals also include livestock raised or nurtured for producing a product for consumption, such as dairy cattle (e.g., production of milk), poultry (e.g., eggs), and fish (e.g., roe for consumption). In particular, the one or more sensor systems 602 are positioned for monitoring properties associated with animals 612 within or proximate to a farming enclosure (e.g., livestock barn 606).

In various embodiments, the imaging sensors are configured to capture image data corresponding to, for example, the presence (or absence), abundance, distribution, size, and behavior of terrestrial objects (e.g., a population of animals 612 as illustrated in FIG. 6). In various embodiments, such captured image data is processed to extract various measurements corresponding to biomass attributes (e.g., various image-related biomass attributes such as previously described with respect to FIG. 1). It should be recognized that although specific sensors are described below for illustrative purposes, various imaging sensors may be implemented in the systems described herein without departing from the scope of this disclosure.

In some embodiments, the imaging sensors of the first sensor system 602a includes one or more cameras configured to capture still images and/or record moving images (e.g., video data). The one or more cameras are directed towards the surrounding environment 604, with each camera capturing a sequence of images (e.g., video frames) of the environment 604 and any objects in the environment. In various embodiments, each camera has a different viewpoint or pose (i.e., location and orientation) with respect to the environment. Although FIG. 6 only shows a single camera for ease of illustration and description, persons of ordinary skill in the art having benefit of the present disclosure should appreciate that the first sensor system 602a can include any number of cameras and which may account for parameters such as each camera's horizontal field of view, vertical field of view, and the like. Further, persons of ordinary skill in the art having benefit of the present disclosure should appreciate that the first sensor system 602a can include any arrangement of cameras (e.g., cameras positioned on different planes relative to each other, single-plane arrangements, spherical configurations, and the like).

In various embodiments, the imaging sensors of the first sensor system 602a includes a first camera (or lens) having a particular field of view 618 as represented by the dashed lines that define the outer edges of the camera's field of view that images the environment 604 or at least a portion thereof. For the sake of clarity, only the field of view 618 for a single camera is illustrated in FIG. 6. In various embodiments, the imaging sensors of the first sensor system 602a includes at least a second camera having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 618 of the first camera of the first sensor system 602a may, in some embodiments, overlap with the fields of view of two other cameras to form an overlapping field of view with three different perspectives of the environment 604.

In some embodiments, the imaging sensors of the first sensor system 602a includes one or more light field cameras configured to capture light field data emanating from the surrounding environment 604. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the first sensor system 602a includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras. However, it should be recognized that the operations described herein may similarly be implemented with any type of imaging sensor without departing from the scope of this disclosure. For example, in various embodiments, the imaging sensors of the first sensor system 602a may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyper-spectral cameras, thermal cameras, other machine vision systems that are operable along various portions of the electromagnetic spectrum (including visible light, infrared, and other bands), sonar cameras (e.g., DIDSON and ARTS sonar cameras), and the like.

In various embodiments, the second sensor system 602b includes one or more three dimensional (3D) surface sensors configured to observe animal behavior and capture measurements associated with biomass attribute parameters related to animal biomass. In various embodiments, such captured 3D surface data is processed to extract various measurements corresponding to biomass attributes (e.g., various image-related biomass attributes such as previously described with respect to FIG. 1). It should be recognized that although specific sensors are described below for illustrative purposes, various 3D surface sensors may be implemented in the systems described herein without departing from the scope of this disclosure.

In various embodiments, the 3D surface sensors of the second sensor system 602b includes one or more of contact and non-contact based 3D surface measurement systems. Contact based 3D surface sensors include, for example, mechanical arms with touch sensitive tips for touch scanning of object surfaces to generate 3D data point. Similarly, in various embodiments, contact sensors (not necessarily for surface sensing) include collars, tags, bioelectrical impedance sensors to measure fat versus lean body mass (e.g., via body conductance/impedance measurements), and the like for measuring various biomass attributes.

Non-contact, non-invasive 3D surface sensors include but are not limited to reflective optical sensors (e.g., structured light sensors), reflective non-optical sensors (e.g., sonar, imaging radar, and other ultrasonic sensors), non-contact emitted imaging sensors (e.g., infrared and thermal sensors), passive reflective sensors that rely on ambient light and surface texture of targets to capture dimensional data (e.g., passive stereo, passive depth from focus/defocus, shape from shading, and the like), active reflective sensors utilizing a controlled light source (e.g., pulsed or modulated light, interferometry sensors, active depth-from-focus/defocus sensors, active triangulation sensors such as 3D laser scanners, active stereoscopic vision systems, and LIDAR), and the like.

In various embodiments, the 3D surface sensor of the second sensor system 602b includes a first laser scanner having a particular field of view 620 as represented by the dashed lines that define the outer edges of the laser scanner's field of view that images the environment 604 or at least a portion thereof. For the sake of clarity, only the field of view 620 for a single 3D surface sensor is illustrated in FIG. 6. In various embodiments, the 3D surface sensors of the second sensor system 602b includes at least a second laser scanner having a different field of view relative to the first laser scanner. Further, it should be recognized that the fields of view are not restricted to being shared between only two laser scanners. For example, at least a portion of the field of view 620 of the first camera of the second sensor system 602b may, in some embodiments, overlap with the fields of view of two other laser scanners to form an overlapping field of view with three different perspectives of the environment 604.

Additionally, as illustrated in FIG. 6, the plurality of sensor systems 602 includes a third sensor system 602c including a third set of one or more sensors. The third set of one or more sensors are configured to monitor the environment 604 proximate the sensor systems 602 and generate data associated with a reference parameter. In particular, the third sensor system 602c of FIG. 6 includes one or more environmental sensors configured to capture measurements associated with the environment 604 within which the system 600 is deployed. As described in further detail below, in various embodiments, the environmental sensors of the third sensor system 602c generate environmental data that serves as reference data for implementing the dynamic weighting of various estimates from a plurality of biomass estimation models.

For example, in one embodiment, the environmental sensors of the third sensor system 602c includes an ambient light sensor or other photodetector configured to sense or otherwise measure an amount of ambient light present within the environment local to the sensor. It should be recognized that although FIG. 6 is described in the specific context of an ambient light sensor, the third sensor system 602c may include any number of and any combination of various environmental sensors without departing from the scope of this disclosure.

The first sensor system 602a and the second sensor system 602b each generate a first biomass attribute parameter data set 608a and a second biomass attribute parameter data set 608b, respectively, representing volumetric, curvilinear (e.g., surface), linear measurements of livestock animals, and the like. In the context of FIG. 6, the first biomass attribute parameter includes image data. The image data may include any image-related value or other measurable factor or characteristic that is representative of at least a portion of a data set that describes the presence (or absence), abundance, distribution, size, and/or behavior of objects (e.g., a population of animals 612 as illustrated in FIG. 5). For example, the image data may include camera images capturing data related to one or more biomass attributes of individual animals of the population of animals 612 within the environment 604. It should be recognized that although the first biomass attribute parameter has been abstracted and described here generally as "image data" for ease of description, those skilled in the art will understand that image data (and therefore the first biomass attribute parameter data set 608a corresponding to the image data) may include, but is not limited to, any of a plurality of image frames, extrinsic parameters defining the location and orientation of the image sensors, intrinsic parameters that allow a mapping between camera coordinates and pixel coordinates in an image frame, camera models, operational parameters of the image sensors (e.g., shutter speed), depth maps, and the like.

In the context of FIG. 6, the second biomass attribute parameter includes 3D surface data. In some embodiments, the laser scanner(s) of the second sensor system 602b generate 3D point cloud data. For example, the 3D surface data may include laser scans capturing data related to one or more biomass attributes of individual animals of the population of fish 612 within the environment 604. 3D point clouds are usually used to detect, other attributes, the shape and pose of target object in 3D coordinate systems. Although described here in the context of laser scanners, 3D point clouds may be generated using various volumetric sensors including but not limited to stereo cameras, time-of-flight (ToF) cameras, and any other sensor capable of capturing shape data of objects to create point clouds from the surface of the object. In various embodiments, pout cloud data includes coordinate Information, point color information, point normal orientation, and the like. As will be appreciated, point cloud data includes volumetric data which is relevant for animal shape or conformation determination in estimating animal biomass.

It should be recognized that although the second biomass attribute parameter has been abstracted and described here generally as "3D surface data" for ease of description, those skilled in the art will understand that 3D surface data (and therefore the second biomass attribute parameter data set 608b corresponding to the 3D surface data) may include, but is not limited to, any of a plurality of laser scans, extrinsic parameters defining the location and orientation of the laser scanners, intrinsic parameters that allow a mapping between laser scanner coordinates and point cloud coordinates, laser scanner models, operational parameters of the laser scanners, depth maps, and the like.

Similarly, in the context of FIG. 6, the reference parameter includes environmental data. Such environmental data may include any measurement representative of the environment 604 within which the environmental sensors are deployed. For example, the environmental data (and therefore the reference parameter data set 608c corresponding to the environmental data) may include, but is not limited to, any of a plurality of ambient light measurements, water turbidity measurements, water temperature measurements, metocean measurements, satellite weather measurements, weather forecasts, air temperature, dissolved oxygen, current direction, current speeds, and the like.

In various embodiments, the processing system 610 receives one or more of the data sets 608 (e.g., first biomass attribute parameter data set 608a, the second biomass attribute parameter data set 608b, and the reference parameter data set 608c) via, for example, wired-telemetry, wireless-telemetry, or any other communications links for processing. The processing system 610 provides the first biomass attribute parameter data set 608a to a first biomass estimation model 622a. The processing system 610 also provides the second biomass attribute parameter data set 608b to a second biomass estimation model 622b different from the first biomass estimation model 622a. In various embodiments, the first biomass estimation model 622a receives the image data of the first biomass attribute parameter data set 608a as input and generates a first biomass estimate 624a. By way of non-limiting example, in some embodiments, the first biomass estimation model 622a utilizes image data related to containing measurements related to one or more biomass attributes of individual animals (or with respect to two or more fish) for generating the first biomass estimate 624a. In various embodiments, the first biomass estimate 624a is a numerical description of a body weight of an individual animal. In some embodiments, the first biomass estimate 624a is a numerical description of an average body weight for animals within the population of animals 612.

The processing system 610 also provides the second biomass attribute parameter data set 608b to a second biomass estimation model 622b. In various embodiments, the second biomass estimation model 622b receives the 3D surface data of the second biomass attribute parameter data set 608b as input and generates a second biomass estimation 624b. By way of non-limiting example, in some embodiments, the second biomass estimation model 622b utilizes 3D surface data containing measurements related to one or more biomass attributes of individual animals (or with respect to two or more fish) for generating the second biomass estimate 624b. In various embodiments, the second biomass estimate 624b is a numerical description of a body weight of an individual animal. In some embodiments, the second biomass estimate 624b is a numerical description of an average body weight for animals within the population of animals 612. In some examples, for example, the 3D surface data captured by the second set of sensors 602b may be analyzed to quantify or otherwise generate 3D point cloud data and volumetric animal data as a biomass attribute for generating the second biomass estimate 624b.

Subsequently, such as previously discussed in more detail with reference to FIGS. 3 and 4, the processing system 610 adaptively weights the first biomass estimate 624a of the first biomass estimation model 622a with a first weighting factor relative to a second weighting factor for a second biomass estimate 624b of the second biomass estimation model 622b in order to determine an aggregated biomass estimate 626 based on a combination of the first biomass estimation model 622a using the first weight factor and the second biomass estimation model 622b using the second weight factor. For example, in one embodiment, the processing system 610 may preferentially weight the second biomass estimation model 622b (i.e., model based on 3D surface data) relative to the first biomass estimation model 622a (i.e., model based on image data) when environmental conditions are indicated by the reference sensor 602c to include dim ambient light conditions that disproportionately reduce quality of optical image capture of the first sensor system 602a relative to laser triangulation by the second sensor system 602b. Similarly, the processing system 610 may preferentially underweight the second biomass estimation model 622b (i.e., model based on 3D surface images) relative to the first biomass estimation model 622a (i.e., model based on optical camera images) when environmental conditions are indicated by the reference sensor 602c to include extremely sunny conditions that provide excellent lighting conditions for the first sensor system 602a but may introduce a significant amount of energy such that some of the points in the 3D point cloud being to saturate, thereby rendering the second sensor system 602b to be less reliable (or at least have less of an accuracy improvement over optical systems relative to dim ambient light conditions).

Figure 7:
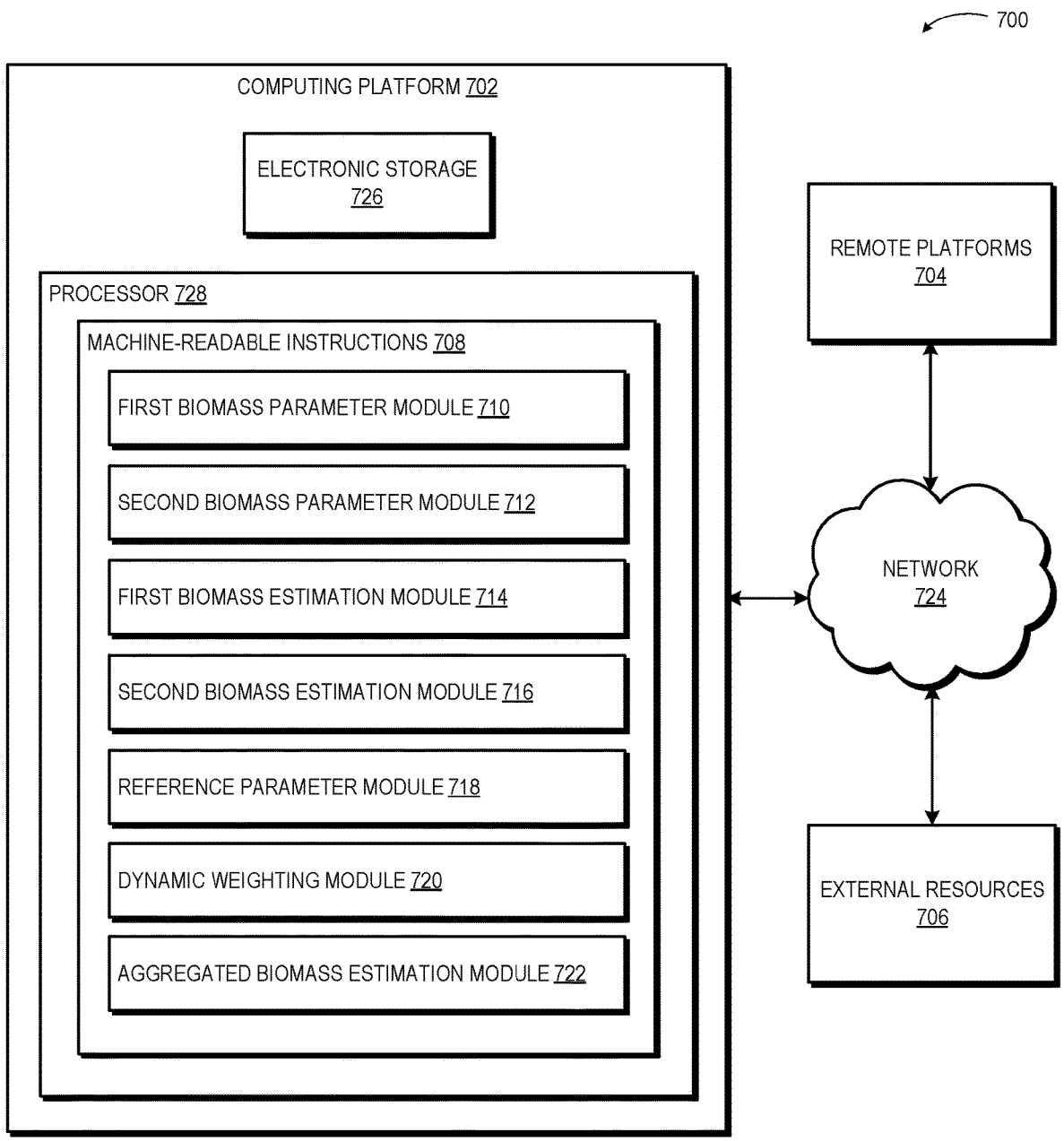
FIG. 7 is a block diagram illustrating a system configured to provide a consensus biomass estimate in accordance with some embodiments.

FIG. 7 is a block diagram illustrating a system 700 configured to provide a biomass estimation in accordance with some embodiments. In some embodiments, the system 700 includes one or more computing platforms 702. The computing platform(s) 702 may be configured to communicate with one or more remote platforms 704 according to a client/server architecture, a peer-to-peer architecture, and/or other architectures via a network 724. Remote platform(s) 704 may be configured to communicate with other remote platforms via computing platform(s) 702 and/or according to a client/server architecture, a peer-to-peer architecture, and/or other architectures via the network 724. Users may access system 700 via remote platform(s) 704. A given remote platform 704 may include one or more processors configured to execute computer program modules. The computer program modules may be configured to enable an expert or user associated with the given remote platform 704 to interface with system 700 and/or one or more external resource(s) 706, and/or provide other functionality attributed herein to remote platform(s) 704. By way of non-limiting example, a given remote platform 704 and/or a given computing platform 702 may include one or more of a server, a desktop computer, a laptop computer, a handheld computer, a tablet computing platform, a NetBook, a Smartphone, a gaming console, and/or other computing platforms.

In some implementations, the computing platform(s) 702, remote platform(s) 704, and/or one or more external resource(s) 706 may be operatively linked via one or more electronic communication links. For example, such electronic communication links may be established, at least in part, via a network 724 such as the Internet and/or other networks. It will be appreciated that this is not intended to be limiting, and that the scope of this disclosure includes implementations in which computing platform(s) 702, remote platform(s) 704, and/or one or more external resource(s) 706 may be operatively linked via some other communication media. External resource(s) 706 may include sources of information outside of system 700, external entities participating with system 700, and/or other resources. In some implementations, some or all of the functionality attributed herein to external resources 706 may be provided by resources included in system 700.

In various embodiments, the computing platform(s) 702 are configured by machine-readable instructions 708 including one or more instruction modules. In some embodiments, the instruction modules include computer program modules for implementing the various operations discussed herein (such as the operations previously discussed with respect to FIG. 4). For purposes of reference, the instruction modules include one or more of a first biomass attribute parameter module 710, a second biomass attribute parameter module 712, a first biomass estimation module 714, a second biomass estimation module 716, a reference parameter module 718, a dynamic weighting module 720, and an aggregated biomass estimate module 722. Each of these modules may be implemented as one or more separate software programs, or one or more of these modules may be implemented in the same software program or set of software programs. Moreover, while referenced as separate modules based on their overall functionality, it will be appreciated that the functionality ascribed to any given model may be distributed over more than one software program. For example, one software program may handle a subset of the functionality of the first biomass attribute parameter module 710 while another software program handles another subset of the functionality of the first biomass attribute parameter module 710 and the functionality of the first biomass estimation module 714.

In various embodiments, the first biomass attribute parameter module 710 generally represents executable instructions configured to receive a first biomass attribute parameter data set associated with a first biomass attribute parameter. With reference to FIGS. 1-6 and 8-9, in various embodiments, the first biomass attribute parameter module 710 receives sensor data including the first biomass attribute parameter data set via a wireless or wired communications link for storage, further processing, and/or distribution to other modules of the system 700. For example, in the context of FIG. 2, the sensor system 202 communicates at least the first parameter data set 208a including acoustic data corresponding to the presence (or absence), abundance, distribution, size, and behavior of underwater objects (e.g., a population of fish and feed). Such acoustic data measurements may, for example, measure intensity of acoustic reflectivity of ensonified objects(s) (e.g., fish) within the water to be used as an approximation of biomass. In various embodiments, such first parameter data sets may be processed by the first biomass attribute parameter module 710 to format or package the data set for use by, for example, biomass estimation models.

In various embodiments, the second biomass attribute parameter module 712 generally represents executable instructions configured to receive a second biomass attribute parameter data set associated with a second biomass attribute parameter. With reference to FIGS. 1-6 and 8-9, in various embodiments, the second biomass attribute parameter module 712 receives sensor data including the second biomass attribute parameter data set via a wireless or wired communications link for storage, further processing, and/or distribution to other modules of the system 700. For example, in the context of FIG. 2, the sensor system 202 communicates at least the second parameter data set 208*b* including under water image data corresponding to for example, the presence (or absence), abundance, distribution, size, and behavior of underwater objects. In the context of FIG. 5, the sensor system 502 communicates at least the second parameter data sets 508*b* including image data from the water surface or above the water surface corresponding to, for example, the presence (or absence), abundance, distribution, size, and behavior of objects (e.g., a population of fish 512 as illustrated in FIG. 5). Such image data include, for example, measurements related to one or more biomass attributes of individual fish (or with respect to two or more fish).

In various embodiments, the first biomass estimation module 714 generally represents executable instructions configured to receive the first biomass attribute parameter data set from the first biomass attribute parameter module 710 and generate a biomass estimate. With reference to FIGS. 1-6 and 8-9, in various embodiments, the first biomass estimation module 714 receives one or more data sets embodying parameters related to biomass, including biomass attribute parameters that provide biomass-related body measurements, factors that may influence the accuracy of biomass estimation models, and the like. For example, in the context of FIG. 2, the first biomass attribute parameter module 710 receives at least the first parameter data set 208 including acoustic data corresponding to the presence (or absence), abundance, distribution, size, and behavior of underwater objects (e.g., a population of fish and feed). In the context of FIG. 5, the first biomass attribute parameter module 710 receives at least a first parameter data set 508*a* including under water image data corresponding to the presence (or absence), abundance, distribution, size, and behavior of underwater objects (e.g., a population of fish and feed). In various embodiments, the first biomass estimation module 714 utilizes one or more learned models (not shown) to generate a first biomass estimate representing one or more biomass-related metrics (i.e., a biomass estimate), as it is influenced by the biomass attribute parameters of the first parameter data set.

In various embodiments, additional inputs such as the results of feeding according to the estimated biomass or biomass-related physical weights (e.g., weights at harvest, body dimension measurements during physical handling, such as during veterinarian treatments, and the like) may be incorporated into the learned model so that the learned model evolves to facilitate the subsequent performance of similar biomass estimation. In various embodiments, the learned model includes a system represented by one or more data structures, executable instructions, or combinations thereof, that is trained and having an internal representation modified or adapted based in input or experience during the training process. One example of the learned model is a neural network. Other implementations include parametric representations, such as coefficients for dynamics models, latent or explicit embedding into metric spaces for methods like nearest neighbors, or the like.

In some embodiments, the learned model of the first biomass estimation module 714 is initialized through a supervised learning process so as to obtain a baseline set of knowledge regarding the operational environment and the performance of at least certain biomass estimations by the first biomass estimation module 714. In other embodiments, the learned model may be initiated at a particular processing system (e.g., computing platform 702) by, for example, populating the learned model with the knowledge of a learned model of other similar biomass estimation models optimized for different locales, or a "default knowledge core" maintained by the computing platform 702 for distribution to each biomass estimation as additional sensor systems and/or parameter data sets are integrated into the systems or otherwise become available to storage and processing.

In various embodiments, the second biomass estimation module 716 generally represents executable instructions configured to receive the second biomass attribute parameter data set from the second biomass attribute parameter module 712 and generate a biomass estimation. With reference to FIGS. 1-6 and 8-9, in various embodiments, the second biomass estimation module 716 receives one or more data sets embodying parameters related to biomass, including factors that directly influence appetite, factors that may influence the accuracy of biomass estimation models, and the like. For example, in the context of FIG. 2, the second biomass estimation module 716 receives at least the second parameter data set 208*b* including under water image data corresponding to, for example, the presence (or absence), abundance, distribution, size, and behavior of underwater objects. In the context of FIG. 5, the second biomass estimation module 716 receives at least the second parameter data set 508*b* including image data from the water surface or above the water surface corresponding to, for example, the presence (or absence), abundance, distribution, size, and behavior of objects (e.g., a population of fish 512 as illustrated in FIG. 5). In various embodiments, the second biomass estimation module 716 utilizes one or more learned models (not shown) to generate a second biomass estimation representing one or more biomass-related metrics (i.e., a biomass estimate), as it is influenced by the biomass attribute parameters of the second parameter data set.

In various embodiments, additional inputs such as the results of feeding according to the estimated biomass or biomass-related physical weights (e.g., weights at harvest, body dimension measurements during physical handling, such as during veterinarian treatments, and the like) may be incorporated into the learned model so that the learned model evolves to facilitate the subsequent performance of similar biomass estimation. In various embodiments, the learned model includes a system represented by one or more data structures, executable instructions, or combinations thereof, that is trained and having an internal representation modified or adapted based in input or experience during the training process. One example of the learned model is a neural network. Other implementations include parametric representations, such as coefficients for dynamics models, latent or explicit embedding into metric spaces for methods like nearest neighbors, or the like.

In some embodiments, the learned model of the second biomass estimation module 716 is initialized through a supervised learning process so as to obtain a baseline set of knowledge regarding the operational environment and the performance of at least certain biomass estimations by the second biomass estimation module 716. In other embodiments, the learned model may be initiated at a particular processing system (e.g., computing platform 702) by, for example, populating the learned model with the knowledge of a learned model of other similar biomass estimation models optimized for different locales, or a "default knowledge core" maintained by the computing platform 702 for distribution to each biomass estimation as additional sensor systems and/or parameter data sets are integrated into the systems or otherwise become available to storage and processing.

In various embodiments, the reference parameter module 718 generally represents executable instructions configured to receive one or more reference data sets associated with a biomass attribute parameter. With reference to FIGS. 1-6 and 8-9, in various embodiments, the reference parameter module 718 receives sensor data including at least one reference parameter data set via a wireless or wired communications link for storage, further processing, and/or distribution to other modules of the system 700. For example, in the context of FIG. 2, the sensor system 202 communicates at least the reference parameter data set 208c including water turbidity measurements to the processing system 210. In the context of FIG. 5, the sensor system 502 communicates at least the reference parameter data sets 508c including ambient light measurements to the processing system 510.

In various embodiments, the dynamic weighting module 720 generally represents executable instructions configured to adaptively weight a first biomass estimate (such as the biomass estimate generated by first biomass estimation module 714) relative to a second biomass estimate (such as the biomass estimate generated by second biomass estimation module 716). With reference to FIGS. 1-6 and 8-9, in various embodiments, the dynamic weighting module 720 receives reference data such as the reference parameter data sets from the reference parameter module 718 and compares, for example, environmental conditions as represented by the reference parameter data sets to determine the relative accuracy amongst a plurality of biomass estimation models under such environmental conditions. For example, in the context of FIGS. 2 and 3, the processing system 210 assigns a relative weighting with the first weighting factor $w_1$ of 0.4 for the first biomass estimation model (based on acoustic data) and the second weighting factor $w_2$ of 0.6 for the second biomass estimation model (based on image data) due to a first set of environmental conditions (e.g., using environmental data from the environmental sensors to measure conditions for a current time or to forecast for a future time period) in which the weather is sunny, waters are clean, but waves are choppy. However, the processing system 210 assigns a relative weighting with the first weighting factor $w_1$ of 0.9 for the first biomass estimation model (based on acoustic data) and the second weighting factor $w_2$ of 0.1 for the second biomass estimation model (based on image data) due to the second set of environmental conditions and discounts the image-based, second biomass estimation model that is expected to be less accurate in murky waters.

In various embodiments, the aggregated biomass estimate module 722 generally represents executable instructions configured to determine an aggregated biomass estimate based on a combination of the first biomass estimation model using the first weight factor and the second biomass estimation model using the second weight factor. With reference to FIGS. 1-6 and 8-9, in various embodiments, the aggregated biomass estimate module 722 receives at least the first biomass estimate generated by the first biomass estimation module 714, the second biomass estimate generated by the second biomass estimation module 716, and the weighting factors assigned by the dynamic weighting module 720. In some embodiments, such as discussed in the context of FIGS. 2, 3 and 8, the aggregated biomass estimate module 722 normalizes a plurality of biomass estimates (e.g., biomass estimates 224a, 224b as represented by model biomass estimates 302a-312N in FIGS. 2-3) and/or biomass-related descriptors (e.g., biomass estimation descriptors 802a-802e of FIG. 8) into a common unit scale.

Subsequently, the aggregated biomass estimate module 722 applies, in the context of FIGS. 2-3, the assigned weighting factors $w_1$, $w_2$ to the first normalized model biomass estimate 304a and the second normalized model biomass estimate 304b, respectively, to generate a first weighted model biomass estimate 306a and a second weighted model biomass estimate 306b. Further, the aggregated biomass estimate module 722 combines these two weighted model biomass estimates 306a, 306b to generate a weighted, aggregated biomass estimate 308 and thereby integrates data from multi-sensor systems to provide a biomass estimate. In some embodiments, such as in the context of FIG. 8, the aggregated biomass estimate module 722 also generates a biomass triggered instruction signal 810 based on the aggregated biomass estimate that instructs a user and/or farming system machinery (e.g., automated feeding system) regarding specific actions to be taken in accordance to the biomass estimate.

The system 700 also includes an electronic storage 726 including non-transitory storage media that electronically stores information. The electronic storage media of electronic storage 726 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 726 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 726 may include one or more virtual storage resources (e.g., cloud storage, a virtual private network, and/or other virtual storage resources). Electronic storage 726 may store software algorithms, information determined by processor(s) 728, information received from computing platform(s) 702, information received from remote platform(s) 704, and/or other information that enables computing platform(s) 702 to function as described herein.

Processor(s) 728 may be configured to provide information processing capabilities in computing platform(s) 702. As such, processor(s) 728 may include one or more of a digital processor, an analog processor, a digital circuit designed to process information, an analog circuit designed to process information, a state machine, and/or other mechanisms for electronically processing information. Although processor(s) 728 is shown in FIG. 7 as a single entity, this is for illustrative purposes only. In some implementations, processor(s) 728 may include a plurality of processing units. These processing units may be physically located within the same device, or processor(s) 728 may represent processing functionality of a plurality of devices operating in coordination. Processor(s) 728 may be configured to execute modules 710, 712, 714, 716, 718, 720, and/or 722, and/or other modules. Processor(s) 728 may be configured to execute modules 710, 712, 714, 716, 718, 720, and/or 722, and/or other modules by software; hardware; firmware; some combination of software, hardware, and/or firmware; and/or other mechanisms for configuring processing capabilities on processor(s) 728. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 710, 712, 714, 716, 718, 720, and/or 722 are illustrated in FIG. 7 as being implemented within a single processing unit, in implementations in which processor(s) 728 includes multiple processing units, one or more of modules 710, 712, 714, 716, 718, 720, and/or 722 may be implemented remotely from the other modules. The description of the functionality provided by the different modules 710, 712, 714, 716, 718, 720, and/or 722 described below is for illustrative purposes, and is not intended to be limiting, as any of modules 710, 712, 714, 716, 718, 720, and/or 722 may provide more or less functionality than is described. For example, one or more of modules 710, 712, 714, 716, 718, 720, and/or 722 may be eliminated, and some or all of its functionality may be provided by other ones of modules 710, 712, 714, 716, 718, 720, and/or 722. As another example, processor(s) 728 may be configured to execute one or more additional modules that may perform some or all of the functionality attributed below to one of modules 710, 712, 714, 716, 718, 720, and/or 722.

Referring now to FIG. 8, illustrated is another example diagram 800 of adaptive weighting of biomass estimations in accordance with some embodiments. As illustrated, a plurality of biomass estimates 802 (which may be model-based outputs or otherwise) include a first biomass estimation descriptor 802*a*, a second biomass estimation descriptor 802*b*, a third biomass estimation descriptor 802*c*, a fourth biomass estimation descriptor 802*d*, and a fifth biomass estimation descriptor 802*e*.

The first biomass estimation descriptor 802*a*, as represented by the word 'adult', corresponds to a textual description indicating size or lifecycle status of fish within a marine enclosure under observation (e.g., fry vs. smolt vs. adult). In various embodiments, the first biomass estimation descriptor 802*a* may be determined based on, for example, data measured by any of the sensor systems discussed herein, such as acoustics-data based sensor system 202*a* of FIG. 2 or by human-vision-perception from a video image stream captured by the image-data based sensor system 202*b* of FIG. 2. The first biomass estimation descriptor 802*a* may be indicative of an overall size estimate of fish, feed formulations and amounts to be dispensed based on life cycle, and the like.

The second biomass estimation descriptor 802*b*, as represented by the number 9, corresponds to a human-provided value on an integer scale of 0-10. In various embodiments, the second biomass estimation descriptor 802*b* may be determined via human visual perception and based on operator personal experience. For example, in some embodiments, the numerical value 9 may represent that the operator visually estimates fish size to be close to harvest weight, which is indicative of increased biomass levels. The third biomass estimation descriptor 802*c*, as represented by the color green, corresponds to a color-coded descriptor relative to average target weight of animals in a red, yellow, and green coloring scheme in which green is indicative of animals being within an expected range of weight (e.g., not underweight, starving, and the like).

The fourth biomass estimation descriptor 802*d*, as represented by the percentage value 80%, corresponds to a percentage quantification of total biomass (e.g., individuals in a population) that have reached a threshold size for harvesting. As a hypothetical example, in some embodiments, a predetermined threshold is set such weight of individual fish exceeding 4 kilograms are ready to be harvested. The fifth biomass estimation descriptor 802*e*, as represented by the value 0.4, corresponds to feeding rate instructions as it relates to pellets per fish individual per minute (PPFPM). In various embodiments, this 0.4 PPFPM value is indicative of a level of appetite at which fish of the estimated biomass level is expected to eat.

As is evident, each of the plurality of biomass estimations 802 is a descriptor that is related to biomass in some manner. However, it will be appreciated that the descriptors and values associated with the plurality of biomass estimations 802 do not share a common baseline for comparison. Accordingly, in various embodiments, the systems described herein (e.g., systems 100-700 of FIGS. 1-7) normalizes each of the plurality of biomass estimations 802 based on a comparison to a corresponding baseline or predetermined threshold, respectively, to generate a normalized model biomass estimate 804. That is, the systems are configured to normalize each of the biomass estimations to a common biomass estimate scale based on their respective comparisons relative to some established parameter, threshold, expected baseline, and the like on which the individual biomass estimation descriptors are based.

For example, with respect to the first biomass estimation, the systems described herein normalize the first biomass estimation descriptor 802*a* based on a comparison to life cycle stage with respect to biomass location to generate a first normalized model biomass estimate 804*a* of 75 based on an example one hundred point scale. Similarly, with respect to the second biomass estimation, the systems normalize the second biomass estimation descriptor 802*b* based on a comparison of the human-provided value of 9 to the integer scale of 0-10 on which it is based for conversion to the same one hundred point scale and generate a second normalized model biomass estimate 804*b* of 90.

With respect to the third biomass estimation, the systems normalize the third biomass estimation descriptor 802*c* of the green color based on a comparison to a color-coded descriptor of hunger in a red, yellow, and green coloring scheme in which green is indicative of biomass at on target weight levels to generate a third normalized model biomass estimate 804*c* of 70 in the one hundred point common scale. With respect to the fourth biomass estimation, the systems normalize the fourth appetite descriptor 802*d* of the percentage 80% based on a comparison relative to an expected percentage quantification of total biomass (e.g., individuals in a population) that are forecasted to have reached a threshold size for harvesting. In this illustrative example, 80% of biomass being above the threshold level generates a fourth normalized model biomass estimate 804*d* of 55 in the one hundred point common scale. Lastly, with respect to the fifth biomass estimation, the systems normalize the fifth appetite descriptor 802*e* of 0.4 PPFPM based on a comparison to feed rates to generate a fifth normalized model biomass estimate 804*e* of 50 in the one hundred point common scale.

It should be recognized that the above-mentioned bases for normalization of disparate biomass estimation descriptors having different individual underlying scales (and also the one hundred point normalization scale) are provided only for simplified illustrative purposes only. In various embodiments, the systems described herein may utilize any appropriate basis for conversion of the different appetite descriptors 802*a*-802*e* to a common normalization scale as will be understood by those skilled in the art.

The systems will adaptively weight the first through fifth biomass estimation models and their associated appetite descriptors/normalized biomass estimate values in a manner similar to that previously discussed in more detail relative to FIGS. 1-7. For ease of illustration, the weighting has been shown in FIG. 8 to be equal weighted such that the systems assign a first weighting factor $w_1$ of 0.2 to the first biomass estimation model, a second weighting factor $w_2$ of 0.2 to the second biomass estimation model, a third weighting factor $w_3$ of 0.2 to the third biomass estimation model, a fourth weighting factor $w_4$ of 0.2 to the fourth biomass estimation model, and a fifth weighting factor $w_5$ of 0.2 to the fifth biomass estimation model. Subsequently, the systems applies the assigned weighting factors $w_1$-$w_5$ to the first through fifth normalized model biomass estimates 804*a*-804*e*, respectively to generate a first weighted model biomass estimate 806*a* of 15, a second weighted model biomass estimate 806*b* of 18, a third weighted model biomass estimate 806*c* of 14, a fourth weighted model biomass estimate 806*d* of 11, and a fifth weighted model biomass estimate 806*e* of 10. Further, the system combines these five weighted model biomass estimates 806*a*-806*e* to generate a weighted, aggregated biomass estimate 808 of 68 and thereby integrates data from multi-sensor systems to provide a consensus biomass estimate incorporating biomass estimates from multiple sources.

In various embodiments, the aggregated biomass estimate 808 may be displayed in a graphical user interface for presentation to a user. For example, a value of 68 (within a 100 point scale) for the aggregated biomass estimate 808 provides context regarding expected biomass quantities, and the user may take action accordingly. In other embodiments, the systems may optionally generate a biomass triggered instruction signal 810 (as represented by the dotted line box) that instructs a user and/or automated feeding system regarding specific actions to be taken in accordance to the biomass estimate (e.g., as quantified by the aggregated biomass estimate 808).

Similar to the first through fifth biomass estimations discussed here with respect to FIG. 8, it will be appreciated that the biomass triggered instruction signal 810 is not limited to any particular format and in various embodiments may, in a manner similar to a reversing of the previous normalization operations, be converted to any appropriate format. Such formats for the biomass triggered instruction signal 810 include, by way of non-limiting example, a stop signal, a color-coded user interface display, a specific feed rate that should be administered, a total feed volume that should be administered, and the like. Additionally, although described above in the context of feeding-related signals, those skilled in the art will recognize that biomass triggered instruction signals are not limited to such contexts and includes any response that may be initiated based at least in part on biomass information such as feed optimization (e.g., changing from a starter feed to a finishing feed, changing feeding rates), harvest actions (e.g., scheduling harvest or pickup of a portion or an entirety of an animal population), animal transfer actions (e.g., transferring from one environment or enclosure to another, sorting animals into different enclosures, culling a subset of the animal population), intervention actions (e.g., scheduling veterinarian visit due to unexpected stall or drop in growth rates), and the like.

Figure 9:
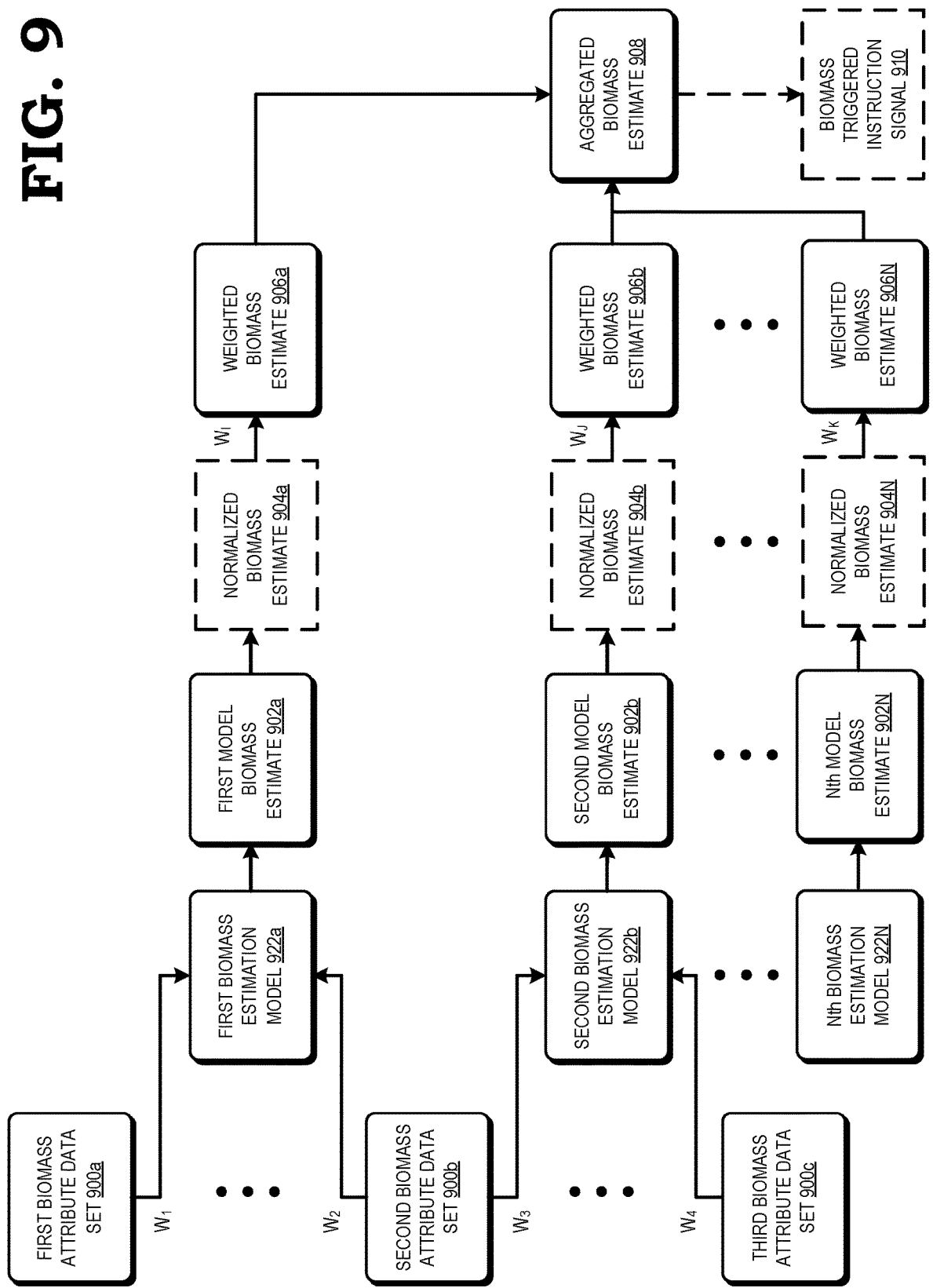
FIG. 9 is a block diagram illustrating an example of adaptive weighting of biomass attribute parameters for multi-parameter biomass estimation models in accordance with some embodiments.

It should be recognized that although biomass attributes and aggregated biomass estimation has been primarily discussed here in the context of dynamic weighting of various biomass estimation model outputs, those skilled in the art will recognize that biomass attribute parameters also have variable contribution with respect to multi-parameter biomass estimation models. Referring now to FIG. 9, illustrated is an example diagram of adaptive weighting of biomass attribute parameters for multi-parameter biomass estimation models in accordance with some embodiments.

As illustrated, a plurality of biomass estimation models (e.g., the first biomass estimation model 922*a* and the second biomass estimation model 922*b*) receive their respective inputs (e.g., one or more of the biomass attribute parameter data sets 900) and generate a plurality of biomass estimations for a number N of different biomass estimation models. In various embodiments, the first biomass estimation model 922*a* is a volumetric model for estimating biomass of an animal based on, for example, body volume and body weight correlations. The first biomass estimation model 922*a* receives, as input, various biomass attribute parameter data sets 900 including a first biomass attribute parameter data set 900*a* and a second biomass attribute parameter data set 900*b*.

In some embodiments, the first biomass attribute parameter data set 900*a* includes volumetric rendering data representing body volume of an animal in three-dimensional space. In various embodiments, such volumetric rendering data may include a three-dimensional point cloud data set representing the surface of an animal. Those skilled in the art will recognize that body surface data may be generated by various sensors (including many sensors described throughout this disclosure) including but not limited to laser scanners, structured light sensors, multi-perspective image rendering, ultrasound imaging, magnetic resonance imaging, and the like.

Body conformation and composition is different amongst different breeds of animals (e.g., breast width in chickens), and different coefficients and exponents are needed for different animal breeds. Accordingly, body composition data is often desirable not only for improved body weight estimation but also for producers looking for insight regarding particular meat qualities (e.g., leaner meat). As will be appreciated, lean muscle mass weighs differently and takes up a different amount of volumetric space relative to body fat per unit weight. Various factors such as body composition of an animal will alter its conductivity in electromagnetic fields. Body fat is generally a poor conductor, whereas components of lean body mass (including water and electrolytes) are generally good conductors. In some embodiments, the second biomass attribute parameter data set 900*b* includes body composition data such as lean body mass, skeletal mass, and the like. Those skilled in the art will recognize that body composition data may be generated by various sensors (including many sensors described throughout this disclosure) including but not limited to ultrasonic systems to estimate fat content of particular body parts, total body electrical conductivity sensors, near infrared interactance sensors, x-ray absorptiometry sensors, acoustic sensors, and the like.

In various embodiments, the first biomass estimation model 922*a* receives a plurality of biomass attribute parameter data sets (such as the volumetric data, body composition data, and the like) and generates one or more output biomass estimate values such as a first model biomass estimate 902*a*

(e.g., body weight). As will be appreciated by those skilled in the art, volume renderings and three dimensional volumetric may have variable precision or accuracy for biomass estimation in the presence (and/or absence) of other factors such as body composition data of the second biomass attribute parameter data set 900b, density data, elasticity data, acoustic impedance data, and the like.

At a high level of abstraction for providing an example, a processing system (e.g., processing system 110 of FIG. 1) assigns a first weighting factor $w_1$ to the first biomass attribute parameter data set 900a and a second weighting factor $w_2$ to the second biomass attribute parameter data set 900b when estimating the biomass of a sheared sheep. However, body surface scanning and its resultant body volume rendering would be less reliable when using, for example, 3D laser scanners to generate point cloud data for the same sheep that has not had its wool clipped. Accordingly, in such circumstances, the processing system assigns a different weighting factor to the first biomass attribute parameter data set 900a that is less than the first weighting factor $w_1$ of FIG. 9 due to occlusion in imagery or sensor data occlusion (e.g., the non-animal object of hair in this example hypothetical that reduces accuracy of body surface scanning).

In some embodiments, the second biomass estimation model 922b is an allometric model that extrapolates one or more measures of body part size to overall body size (e.g., weight). Allometric relationships are fairly well defined for a number of animal species, allowing the measurement of one or more parts of an animal to enable accurate estimates of other parameters (e.g., relating a body part measurement to total body weight of an animal). For example, body length and weight are highly correlated in many fish species. Similarly, certain body measurements, such as heart girth in swine and shank length in poultry, are also known to be proportional to total body weight. In various embodiments, such body part size data includes animal body measurements including but not limited to measurements of length, width, height, girth, curvature, other dimensional features of various body parts, and other geometrical features relevant to biomass estimation. Those skilled in the art will recognize that body part size data may be generated by various sensors including many sensors described throughout this disclosure.

The second biomass estimation model 922b receives, as input, various biomass attribute parameter data sets 900 including the second biomass attribute parameter data set 900b (which was also used by the first biomass estimation model 922a) and a third biomass attribute parameter data set 900c. In some embodiments, the third biomass attribute parameter data set 900c includes a heart girth measurement. The second biomass estimation model 922 receives a plurality of biomass attribute parameter data sets (such as the body composition data, the heart girth measurement, and the like) and generates one or more output biomass estimate values such as a second model biomass estimate 902b (e.g., body weight).

At a high level of abstraction for providing an example, a processing system (e.g., processing system 110 of FIG. 1) assigns a third weighting factor $w_3$ to the second biomass attribute parameter data set 900b and a fourth weighting factor $w_4$ to the third biomass attribute parameter data set 900c when estimating the biomass of a pig using heart girth measurements generated from imagery from multiple perspectives (e.g., including two or more of a left side view, a right side view, a top-down view, a perspective view, a bottom-up view, and the like). As will be appreciated by those skilled in the art, biomass estimation using allometric relationships may have variable precision or accuracy in the presence (and/or absence) of other factors such as body composition data of the second biomass attribute parameter data set 900b, availability of other body part measurements, the accuracy of body part measurements, and the like. Accordingly, for a hypothetical circumstance in which heart girth is generated only a singular perspective image view in which part of the pig is occluded by other objects (e.g., other pigs), the processing system assigns a different weighting factor to the third biomass attribute parameter data set 900c that is less than the fourth weighting factor $w_4$ of FIG. 9.

In this manner, the dynamic weighting of biomass attribute data sets described herein accounts for variable contribution of different data sets in estimating biomass. Using allometric relationships, the dynamic weighting of biomass attributes allows for assessment of various important biological parameters in the field including body part size relative to growth or size of entire animal bodies. The dynamic multi-parameter weighting of FIG. 9 described above generates various biomass estimates 902 that, in various embodiments, are utilizable by themselves to generate biomass-triggered instruction signals (not shown). In some embodiments, a multi-parameter biomass estimate (e.g., first model biomass estimate 902a) is further dynamically weighted in combination with additional biomass estimates (e.g., second model biomass estimate 902b, biomass estimates 302 of FIG. 3, and the like) to generate a consensus biomass estimate (e.g., aggregated biomass estimate 908).

In a manner similar to the operations previously described with respect to FIG. 3, in various embodiments, a processing system optionally (as indicated by the dotted lines) normalizes each of the model biomass estimates 902a through 902N to a common biomass representation scale. For example, as illustrated in FIG. 9, the processing system normalizes the first model biomass estimate 902a to generate a first normalized model biomass estimate 904a. Similarly, the processing system normalizes the second model biomass estimate 902b based on the same scale to generate a second normalized model biomass estimate 904b.

In various embodiments, such as previously discussed in more detail with respect to FIG. 2, environmental sensors generate environmental data that serves as reference data for implementing the dynamic weighting of various estimates from a plurality of biomass estimation models. For example, in various embodiments, the biomass attribute parameter data sets 900 are compared relative to measured reference (e.g., environmental) data. Accordingly, the processing system assigns weighting factors $w_1$ to the first biomass estimate 902a (or the normalized estimate), $w_J$ to the second biomass estimate 902b (or the normalized estimate), and $w_K$ to the Nth biomass estimate 902N (or the normalized estimate) to generate weighted model biomass estimates 906a, 906b, through 906N, respectively.

Further, the processing system combines these weighted biomass estimates 906a-906N to generate a weighted, aggregated biomass estimate 908 and thereby integrates data from multi-sensor systems (some sensors and estimation models being more accurate than others, sometimes in all instances or sometimes depending on variable factors such as the environment) measuring biomass attributes to provide a biomass estimate. Similarly, although not explicitly described herein, the weighted, aggregated biomass estimate 908 may be generated by integrating biomass attribute data and estimates from multiple discrete body-part-to-biomass models (e.g., poultry shank-length and head-size to whole body weight).

In various embodiments, the systems described herein may optionally generate a biomass triggered instruction signal 910 (as represented by the dotted line box) based at least in part on the aggregated biomass estimate 908 that instructs a user and/or one or more farm systems regarding specific actions to be taken in accordance to the biomass estimate (e.g., as quantified by the aggregated biomass estimate 908). For example, in some embodiments, the biomass triggered instruction signal 910 (as represented by the dotted line box) based at least in part on the aggregated biomass estimate 908 that instructs an automated feeding system regarding specific actions to be taken in accordance to the biomass estimate (e.g., change an amount of feed dispensed, change a formulation of feed dispensed, and the like).

Although primarily discussed here in the context of aquaculture as it relates to the feeding of fish, those skilled in the art will recognize that the techniques described herein may be applied to any aquatic, aquaculture species such as shellfish, crustaceans, bivalves, and the like without departing from the scope of this disclosure. Further, those skilled in the art will recognize that the techniques described herein may also be applied to adaptively weighting feeding models and providing aggregated biomass estimation for any husbandry animal that is reared in an environment in which multiple different sensor systems are applied, and for which the sensor systems will vary in accuracy of biomass estimation depending on environmental conditions, differing availability of data over time, differing data granularities, and the like.

Additionally, although primarily illustrated and discussed here in the context of fish being positioned in an open water environment (which will also include an enclosure of some kind to prevent escape of fish into the open ocean), those skilled in the art will recognize that the techniques described herein may similarly be applied to any type of aquatic farming environment. For example, such aquatic farming environments may include, by way of non-limiting example, lakes, ponds, open seas, recirculation aquaculture systems (RAS) to provide for closed systems, raceways, indoor tanks, outdoor tanks, and the like. Additionally, those skilled in the art will recognize that an enclosure includes any device or method used to contain an animal.

Accordingly, as discussed herein, FIGS. 1-9 describe techniques that improve the precision and accuracy of biomass estimation and decreasing the uncertainties associated with conventional biomass estimation systems by adaptively weighting different biomass attributes and biomass estimates from different biomass estimation models and combining them into an aggregated biomass estimate that is more accurate than would be individually provided by each biomass estimation model by itself. Further, the techniques described here provide an efficient manner for farmers to integrate the ever increasing suite of available sensor technologies in the future with any sensors currently utilized at their farming sites to improve biomass estimation and the results of aquaculture operations. Additionally, the techniques described here provide for improved estimation of an animal's current weight or, using serial measurements, can be used to monitor trends in weight gain or loss (e.g., to allow earlier identification of conditions resulting in weight problems such as loss of appetite/feeding due to disease).

In some embodiments, certain aspects of the techniques described above may implemented by one or more processors of a processing system executing software. The software includes one or more sets of executable instructions stored or otherwise tangibly embodied on a non-transitory computer readable storage medium. A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for providing a fish biomass estimate, the method comprising:
providing a first biomass parameter data set associated with a first biomass attribute parameter to a biomass estimation model; and
generating a weighted biomass estimate by adaptively weighting, based at least on a fish density datapoint, a first contribution of the first biomass parameter dataset relative to a second contribution of a second biomass parameter data set to the biomass estimation model.

2. The method of claim 1, wherein adaptively weighting the first contribution of the first biomass parameter dataset further comprises:
providing a measured reference data related to the first biomass attribute parameter;
assigning a first weight factor based on a comparison of the first biomass parameter data set with the measured reference data.

3. The method of claim 2, further comprising:
providing measured reference data that is indicative of one or more of a relative accuracy difference, a relative data availability difference, and a relative data granularity difference between the first biomass parameter data set and the second biomass parameter data set.

4. The method of claim 1, further comprising:
providing measured environmental data that is indicative of one or more environmental conditions associated with capture of the first biomass parameter data set and the second biomass parameter data set.

5. The method of claim 1, further comprising:
generating, based at least in part on the weighted biomass estimate, a feeding recommendation related to administration of feed.

6. The method of claim 5, further comprising:
providing a feeding instruction signal based on one or more of the feeding recommendation and the weighted biomass estimate for modifying operations of a feed control system.

7. A non-transitory computer readable medium embodying a set of executable instructions, the set of executable instructions to manipulate at least one processor to:
provide a first biomass parameter data set associated with a first biomass attribute parameter to a biomass estimation model; and
generate a weighted biomass estimate by adaptively weighting, based at least on a fish density datapoint, a first contribution of the first biomass parameter dataset relative to a second contribution of a second biomass parameter data set to the biomass estimation model.

8. The non-transitory computer readable medium of claim 7, further embodying executable instructions to manipulate at least one processor to:
provide a measured reference data related to the first biomass attribute parameter;
assign a first weight factor based on a comparison of the first biomass parameter data set with the measured reference data.

9. The non-transitory computer readable medium of claim 8, further embodying executable instructions to manipulate at least one processor to:
provide measured reference data that is indicative of one or more of a relative accuracy difference, a relative data availability difference, and a relative data granularity difference between the first biomass parameter data set and the second biomass parameter data set.

10. The non-transitory computer readable medium of claim 7, further embodying executable instructions to manipulate at least one processor to:
provide measured environmental data that is indicative of one or more environmental conditions associated with capture of the first biomass parameter data set and the second biomass parameter data set.

11. The non-transitory computer readable medium of claim 7, further embodying executable instructions to manipulate at least one processor to:
generate, based at least in part on the weighted biomass estimate, a feeding recommendation related to administration of feed.

12. The non-transitory computer readable medium of claim 11, further embodying executable instructions to manipulate at least one processor to:
provide a feeding instruction signal based on one or more of the feeding recommendation and the weighted biomass estimate for modifying operations of a feed control system.

13. A system, comprising:
a first set of one or more sensors configured to generate a first biomass parameter data set associated with a first biomass attribute parameter;
a second set of one or more sensors configured to generate a second biomass parameter data set associated with a second biomass attribute parameter;
a digital storage medium, encoding instructions executable by a computing device;
a processor, communicably coupled to the digital storage medium, configured to execute the instructions, wherein the instructions are configured to:
provide a first biomass parameter data set associated with a first biomass attribute parameter to a biomass estimation model; and
generate a weighted biomass estimate by adaptively weighting, based at least on a fish density datapoint, a first contribution of the first biomass parameter dataset relative to a second contribution of a second biomass parameter data set to the biomass estimation model.

14. The system of claim 13, wherein the processor is further configured to:
receive a measured reference data related to the first biomass attribute parameter and the second biomass attribute parameter;
assign the first weight factor to the first biomass parameter data set based on a comparison with the measured reference data; and
assign the second weight factor to the second biomass parameter data set based on the comparison with the measured reference data.

15. The system of claim 13, wherein the processor is further configured to:
receive measured reference data that is indicative of one or more of a relative accuracy difference, a relative data availability difference, and a relative data granularity difference between the first biomass parameter data set and the second biomass parameter data set.

16. The system of claim 13, wherein the processor is further configured to:
receive measured environmental data that is indicative of one or more environmental conditions associated with capture of the first biomass parameter data set and the second biomass parameter data set.

17. The system of claim 13, wherein the first set of one or more sensors includes one or more cameras configured to capture imagery of animals within an aquatic environment.

18. The system of claim 13, wherein the second set of one or more sensors includes one or more acoustic sensors configured to record acoustic data generated by animals within an aquatic environment.

19. The system of claim 18, wherein the second set of one or more sensors are configured to capture fish density data associated with a volume of water imaged by the first set of one or more sensors.

* * * * *